US010650574B2

(12) United States Patent
Holzer et al.

(10) Patent No.: US 10,650,574 B2
(45) Date of Patent: *May 12, 2020

(54) GENERATING STEREOSCOPIC PAIRS OF IMAGES FROM A SINGLE LENS CAMERA

(71) Applicant: Fyusion, Inc., San Francisco, CA (US)

(72) Inventors: Stefan Johannes Josef Holzer, San Mateo, CA (US); Radu Bogdan Rusu, San Francisco, CA (US); Yuheng Ren, San Bruno, CA (US)

(73) Assignee: Fyusion, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/408,211

(22) Filed: Jan. 17, 2017

(65) Prior Publication Data
US 2017/0126988 A1  May 4, 2017

Related U.S. Application Data

(63) Continuation-in-part of application No. 14/530,669, filed on Oct. 31, 2014, now abandoned, and a
(Continued)

(51) Int. Cl.
*G06T 15/20* (2011.01)
*H04N 5/265* (2006.01)
(Continued)

(52) U.S. Cl.
CPC ............ *G06T 15/205* (2013.01); *G06T 7/337* (2017.01); *H04N 5/265* (2013.01); *H04N 13/279* (2018.05)

(58) Field of Classification Search
None
See application file for complete search history.

(56) References Cited

U.S. PATENT DOCUMENTS 5,926,190 A     7/1999  Turkowski et al.
6,031,564 A  *  2/2000  Ma .................... G06T 3/0093
                                                    348/43
(Continued)

OTHER PUBLICATIONS

Sebastian Knorr, Matthias Kunter, Thomas Sikora, "Stereoscopic 3D from 2D video with super-resolution capability", 2008, Elsevier, Signal Processing: Image Communication, vol. 23, pp. 665-676.*
(Continued)

*Primary Examiner* — Robert Bader
(74) *Attorney, Agent, or Firm* — Kwan & Olynick LLP

(57) ABSTRACT

Various embodiments of the present disclosure relate generally to systems and processes for generating stereo pairs for virtual reality. According to particular embodiments, a method comprises obtaining a monocular sequence of images using the single lens camera during a capture mode. The sequence of images is captured along a camera translation. Each image in the sequence of images contains at least a portion of overlapping subject matter, which includes an object. The method further comprises generating stereo pairs, for one or more points along the camera translation, for virtual reality using the sequence of images. Generating the stereo pairs may include: selecting frames for each stereo pair based on a spatial baseline; interpolating virtual images in between captured images in the sequence of images; correcting selected frames by rotating the images; and rendering the selected frames by assigning each image in the selected frames to left and right eyes.

20 Claims, 25 Drawing Sheets

Related U.S. Application Data continuation-in-part of application No. 14/800,638, filed on Jul. 15, 2015, now Pat. No. 9,940,541, and a continuation-in-part of application No. 14/860,983, filed on Sep. 22, 2015.

(51) Int. Cl.
*G06T 7/33* (2017.01)
*H04N 13/279* (2018.01)

(56) References Cited

U.S. PATENT DOCUMENTS

| | | | |
|---|---|---|---|
| 6,252,974 | B1 | 6/2001 | Martens et al. |
| 8,078,004 | B2 | 12/2011 | Kang et al. |
| 8,401,276 | B1* | 3/2013 | Choe .................. G01C 11/06 382/154 |
| 2002/0094125 | A1 | 7/2002 | Guo |
| 2006/0188147 | A1 | 8/2006 | Rai et al. |
| 2007/0008312 | A1* | 1/2007 | Zhou ..................... G06T 7/80 345/419 |
| 2007/0110338 | A1* | 5/2007 | Snavely ............ G06K 9/00637 382/305 |
| 2008/0106593 | A1 | 5/2008 | Arfvidsson et al. |
| 2008/0152258 | A1 | 6/2008 | Tulkki |
| 2008/0201734 | A1 | 8/2008 | Lyon et al. |
| 2008/0225132 | A1 | 9/2008 | Inaguma |
| 2008/0246759 | A1 | 10/2008 | Summers |
| 2008/0278569 | A1* | 11/2008 | Rotem .................. H04N 13/221 348/43 |
| 2009/0160934 | A1* | 6/2009 | Hendrickson .......... G03B 35/08 348/47 |
| 2009/0263045 | A1 | 10/2009 | Szeliski et al. |
| 2009/0303343 | A1 | 12/2009 | Drimbarean et al. |
| 2010/0033553 | A1 | 2/2010 | Levy |
| 2010/0079667 | A1* | 4/2010 | Turetken et al. .... H04N 7/0137 348/443 |
| 2010/0171691 | A1 | 7/2010 | Cook et al. |
| 2010/0305857 | A1* | 12/2010 | Byrne ..................... G06T 7/73 701/301 |
| 2011/0254835 | A1 | 10/2011 | Segal |
| 2011/0261050 | A1 | 10/2011 | Smolic et al. |
| 2012/0019557 | A1 | 1/2012 | Aronsson et al. |
| 2012/0147224 | A1 | 6/2012 | Takayama |
| 2013/0155180 | A1 | 6/2013 | Wantland et al. |
| 2013/0162634 | A1 | 6/2013 | Baik |
| 2013/0250045 | A1 | 9/2013 | Ki et al. |
| 2014/0087877 | A1 | 3/2014 | Krishnan |
| 2014/0198184 | A1* | 7/2014 | Stein .................. G06K 9/00791 348/47 |
| 2014/0253436 | A1 | 9/2014 | Petersen |
| 2014/0307045 | A1 | 10/2014 | Richardt et al. |
| 2015/0130799 | A1 | 5/2015 | Holzer et al. |
| 2015/0130800 | A1 | 5/2015 | Holzer et al. |
| 2015/0130894 | A1 | 5/2015 | Holzer et al. |
| 2015/0134651 | A1 | 5/2015 | Holzer et al. |
| 2015/0138190 | A1 | 5/2015 | Holzer et al. |
| 2015/0339846 | A1 | 11/2015 | Holzer et al. |
| 2017/0018054 | A1 | 1/2017 | Holzer et al. |
| 2017/0018055 | A1 | 1/2017 | Holzer et al. |
| 2017/0018056 | A1 | 1/2017 | Holzer et al. |
| 2017/0084001 | A1 | 3/2017 | Holzer et al. |

OTHER PUBLICATIONS

Hung-Ming Wang, Yan-Hong Chen, Jar-Ferr Yang, "Stereoscopic Video Generation from Monoscopic Compressed Moving Videos", Dec. 3, 2008, IEEE, APCCAS 2008—2008 IEEE Asia Pacific Conference on Circuits and Systems, pp. 1482-1485.*

Guofeng Zhang, Wei Hua, Xueying Qin, Tien-Tsin Wong, Hujun Bao, "Stereoscopic Video Synthesis from a Monocular Video", Aug. 2007, IEEE, IEEE Transactions on Visualization and Computer Graphics, vol. 13, No. 4, pp. 686-696.*

Lihi Zelnik-Manor, Michal Irani, "Multiview Constraints on Homographies", Feb. 2002, IEEE, IEEE Transactions on Pattern Analysis and Machine Intelligence, vol. 24, No. 2, pp. 214-223.*

Victor Adrian Prisacariu, Olaf Kahler, David W. Murray, Ian D. Reid, "Simultaneous 3D Tracking and Reconstruction on a Mobile Phone", Oct. 4, 2013, IEEE, IEEE International Symposium on Mixed and Augmented Reality 2013 Science and Technology Proceedings, pp. 89-98.*

Jens Klappstein, Tobi Vaudrey, Clemens Rabe, Andreas Wedel, "Moving Object Segmentation Using Optical Flow and Depth Information", 2009, Springer, In: Wada T., Huang F., Lin S. (eds) Advances in Image and Video Technology. PSIVT 2009. Lecture Notes in Computer Science, vol. 5414, pp. 611-623.*

Hong-Chang Shin, Yong-Jin Kim, Hanhoon Park, and Jong-Il Park, "Fast View Synthesis using GPU for 3D Display", Dec. 22, 2008, IEEE, IEEE Transactions on Consumer Electronics, vol. 54, No. 4, pp. 2068-2076.*

Guofeng Zhang, Wei Hua, Xueying Qin, Yuanlong Shao, Hujun Bao, "Video stabilization based on a 3D perspective camera model", Nov. 2009, Springer, The Visual Computer (2009) 25: 997.*

Martin A. Fischler, Robert C. Bolles, "Random Sample Consensus: A Paradigm for Model Fitting with Applications to Image Analysis and Automated Cartography", Jun. 1981, ACM, Communications of the ACM, vol. 24, No. 6, pp. 381-395.*

Simon Gibson, Jon Cook, Toby Howard, Roger Hubbold, Dan Oram, "Accurate Camera Calibration for Off-line, Video-Based Augmented Reality", Oct. 1, 2002, IEEE, Proceedings of the International Symposium on Mixed and Augmented Reality (ISMAR'02).*

Krystian Mikolajczyk, Cordelia Schmid, "A Performance Evaluation of Local Descriptors", Oct. 2005, IEEE, IEEE Transactions on Pattern Analysis and Machine Intelligence, vol. 27, No. 10, pp. 1615-1630.*

Christian Weigel, Leif Lennart Kreibich, "Advanced 3D Video Object Synthesis Based on Trilinear Tensors", Jul. 1, 2006, IEEE, 2006 IEEE Tenth International Symposium on Consumer Electronics, 2006. ISCE '06.*

VideoHelp Forum, "Extract all frames from video files", Oct. 6, 2010, website, retrieved from https://forum.videohelp.com/threads/326738-Extract-all-frames-from-video-files on Aug. 24, 2019.*

Andrea Fusiello, "Specifying Virtual Cameras in Uncalibrated View Synthesis", May 2007, IEEE, IEEE Transactions on Circuits and Systems for Video Technology, vol. 17, No. 5.*

Zhengyou Zhang, Rachid Deriche, Olivier Faugeras, Quang-Tuan Luong, "A robust technique for matching two uncalibrated images through the recovery of the unknown epipolar geometry", 1995, Elsevier, Artificial Intelligence 78 (1995) 87-119.*

* cited by examiner

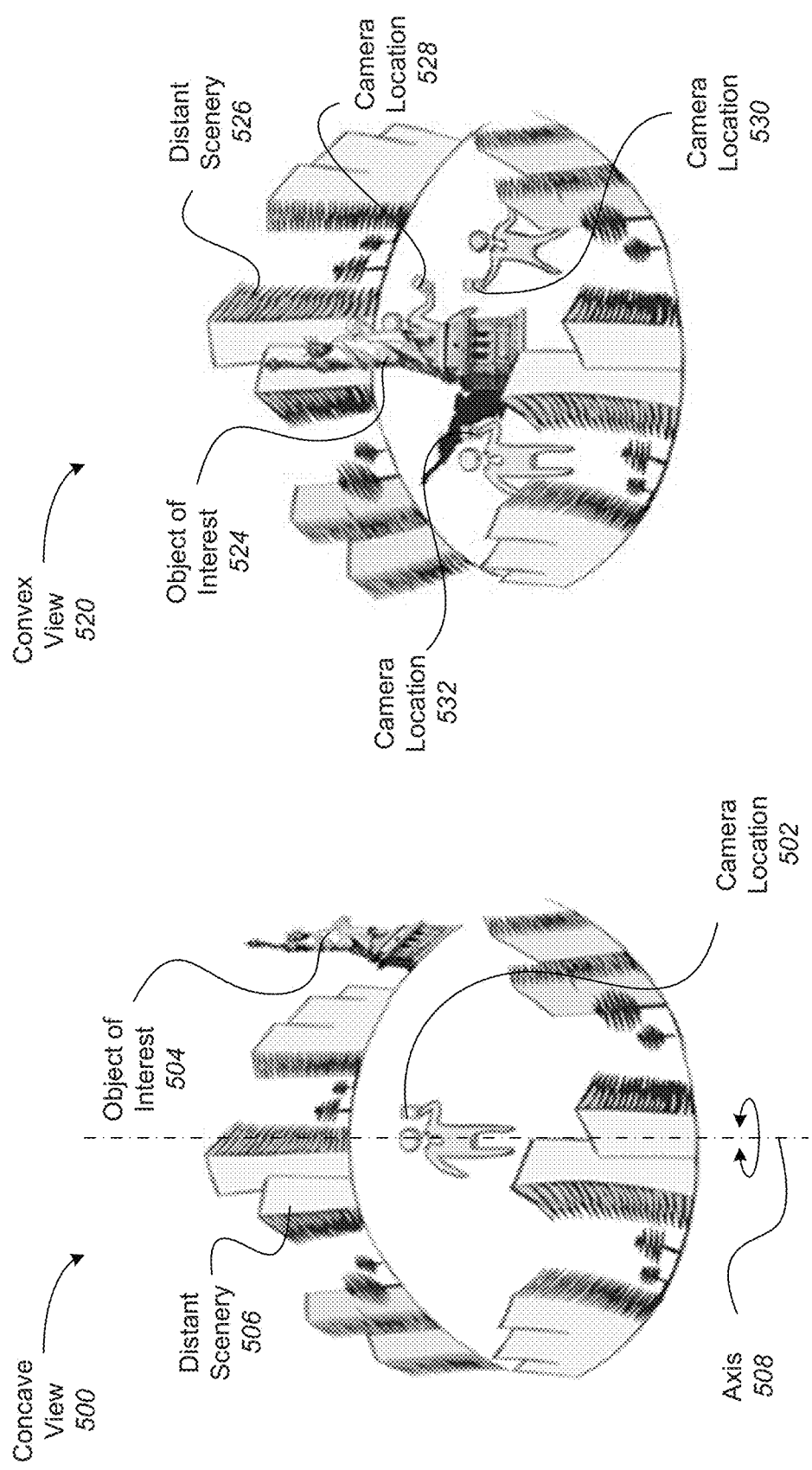

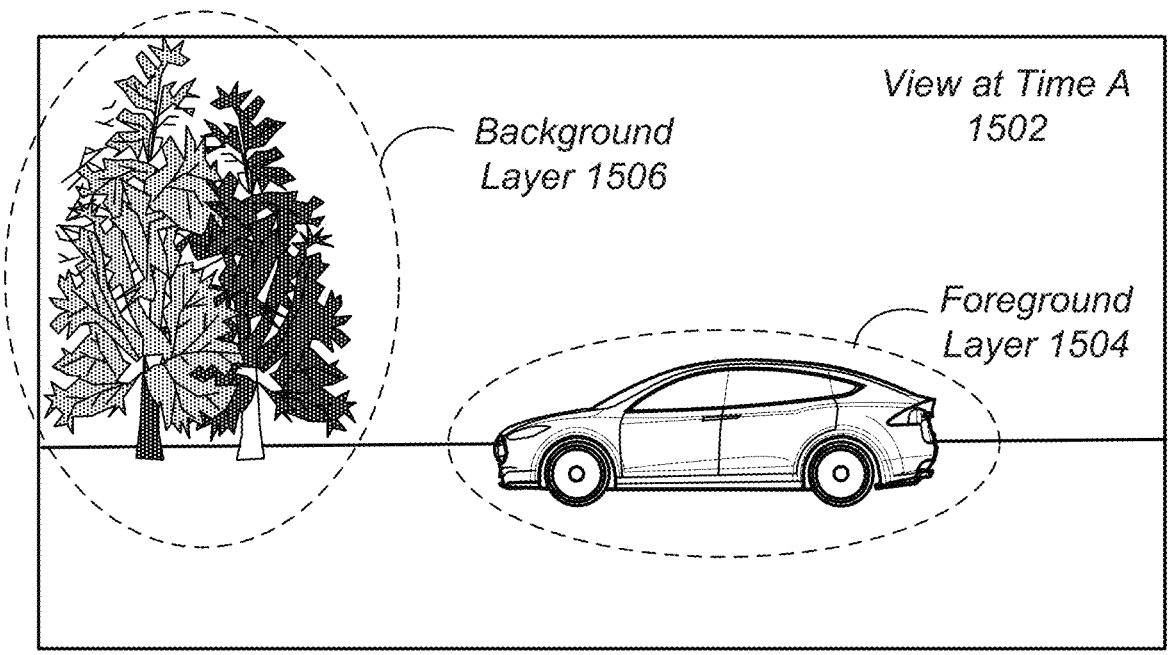
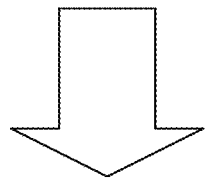
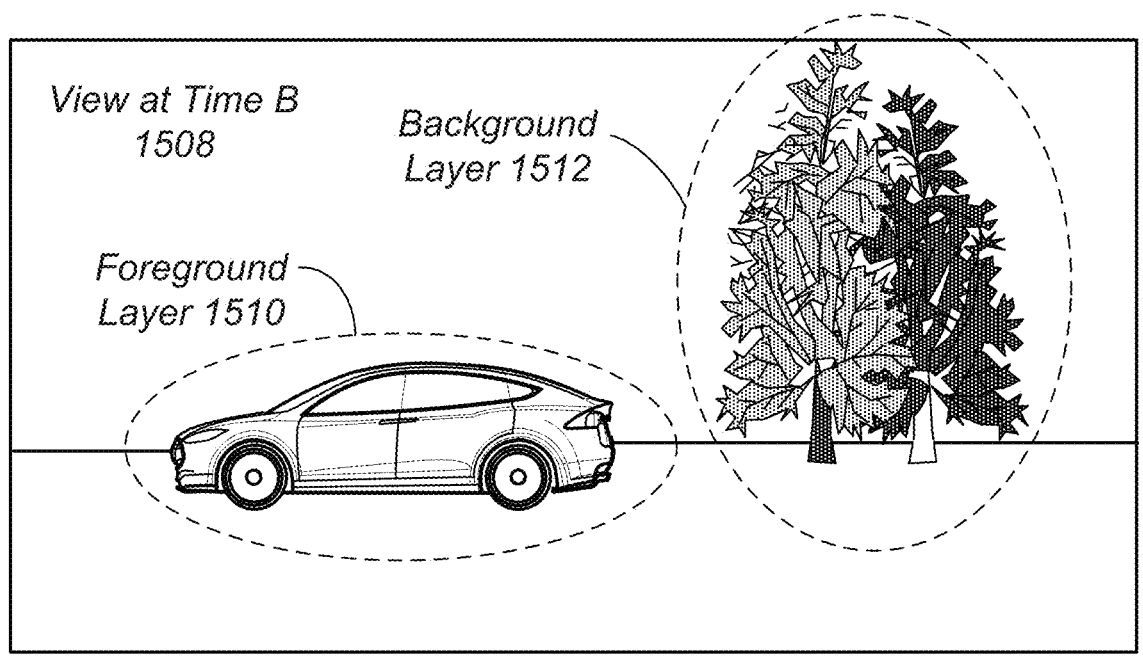
FIG. 15

GENERATING STEREOSCOPIC PAIRS OF IMAGES FROM A SINGLE LENS CAMERA

CROSS-REFERENCE TO RELATED APPLICATIONS

This application is a continuation-in-part of U.S. patent application Ser. No. 14/530,669 by Holzer et al., filed on Oct. 31, 2014, titled "Analysis and Manipulation of Images and Video for Generation of Surround Views;" and a continuation-in-part of U.S. patent application Ser. No. 14/800,638 by Holzer et al., filed on Jul. 15, 2015, titled "Artificially Rendering Images Using Interpolation of Tracked Control Points;" and a continuation-in-part of U.S. patent application Ser. No. 14/860,983 by Holzer et al., filed on Sep. 22, 2015, titled "Artificially Rendering Images Using Viewpoint Interpolation and Extrapolation." The above referenced applications are incorporated by reference herein in their entirety and for all purposes.

TECHNICAL FIELD

The present disclosure relates generally to the capture and presentation of image sequences, and more specifically to the generation of stereoscopic image pairs.

BACKGROUND

With modern computing platforms and technologies shifting towards mobile and wearable devices that include camera sensors as native acquisition input streams, the desire to record and preserve moments digitally in a different form than more traditional two-dimensional (2D) flat images and videos has become more apparent. Traditional digital media formats typically limit their viewers to a passive experience. For instance, a 2D flat image can be viewed from one angle and is limited to zooming in and out. Accordingly, traditional digital media formats, such as 2D flat images, do not easily lend themselves to reproducing memories and events with high fidelity.

Producing a stereoscopic image (or "stereogram") allows a user to experience depth within view an object and/or scenery. Most previously existing methods of creating a stereoscopic image involve capturing two offset images (a "stereo pair") and presenting them separately to the left eye and the right eye of the user. Such two-dimensional images may then be combined in the user's brain to give the perception of three-dimensional depth. Such approaches may require specialized camera or devices to capture two offset images of a scene or object, which are stored for each view. This may also increase storage requirements and limit the efficiency of these methods in processing speed as well as transfer rates when sending it over a network. Accordingly, improved mechanisms for generating stereoscopic image pairs are desirable and provided herein.

SUMMARY

Provided are various mechanisms and processes relating to generating synthetic stereoscopic pairs (stereo pairs) of images using monocular image sequences. In one aspect, which may include at least a portion of the subject matter of any of the preceding and/or following examples and aspects, a method for generating stereo pairs for virtual reality using a single lens camera is provided. The method comprises obtaining a monocular sequence of images using the single lens camera during a capture mode. The sequence of images is captured along a camera translation. Each image in the sequence of images contains at least a portion of overlapping subject matter, which includes an object. In some embodiments, each image in the sequence of images is captured at a predetermined distance along the camera translation. In some embodiments, the camera captures images while traveling along an arc path with points $t_1$ through $t_{100}$ evenly distributed along the arc path. In some embodiments, the sequence of images are fused to generate a surround view of the object, the surround view depicting a three-dimensional view of the object without actually generating a three-dimensional model of the object.

The method further comprises generating stereo pairs for virtual reality using the sequence of images. The stereo pairs are generated for one or more points along the camera translation. In various embodiments, generating the stereo pairs may include: selecting frames for each stereo pair based on a spatial baseline; interpolating virtual images in between captured images in the sequence of images; correcting selected frames by rotating the images; and rendering the selected frames by assigning each image in the selected frames to left and right eyes.

In some embodiments, the sequence of images are obtained as the camera travels along a uniform camera translation, and each stereo pair includes a first image, and a second image located at a predetermined point from the first image. In some embodiments, a stereo pair includes an interpolated virtual image as one of the selected frames. In some embodiments, correcting the selected frames includes rotating the image of a selected frame such that the image is angled toward the object at a desired angle.

Other implementations of this disclosure include corresponding devices, systems, and computer programs, configured to perform the actions of the described method. For instance, a non-transitory computer readable medium is provided comprising one or more programs configured for execution by a computer system. In some embodiments, the one or more programs include instructions for performing the actions of described methods and systems. These other implementations may each optionally include one or more of the following features. In another aspect, which may include at least a portion of the subject matter of any of the preceding and/or following examples and aspects, a system for generating stereo pairs for virtual reality comprises a single lens camera, a processor, and memory storing one or more programs configured for execution by the processor. The one or more programs comprise instructions for performing the actions of described methods and systems.

These and other embodiments are described further below with reference to the figures.

BRIEF DESCRIPTION OF THE DRAWINGS

The disclosure may best be understood by reference to the following description taken in conjunction with the accompanying drawings, which illustrate particular embodiments of the present disclosure.

FIGS. 5A-5B illustrate examples of concave view and convex views, respectively, where both views use a back-camera capture style.

FIG. 15 illustrates an example of combining image information gathered from two frames to artificially render an image in another frame using multiple layers extracted from surround views.

DETAILED DESCRIPTION

Figure 1:
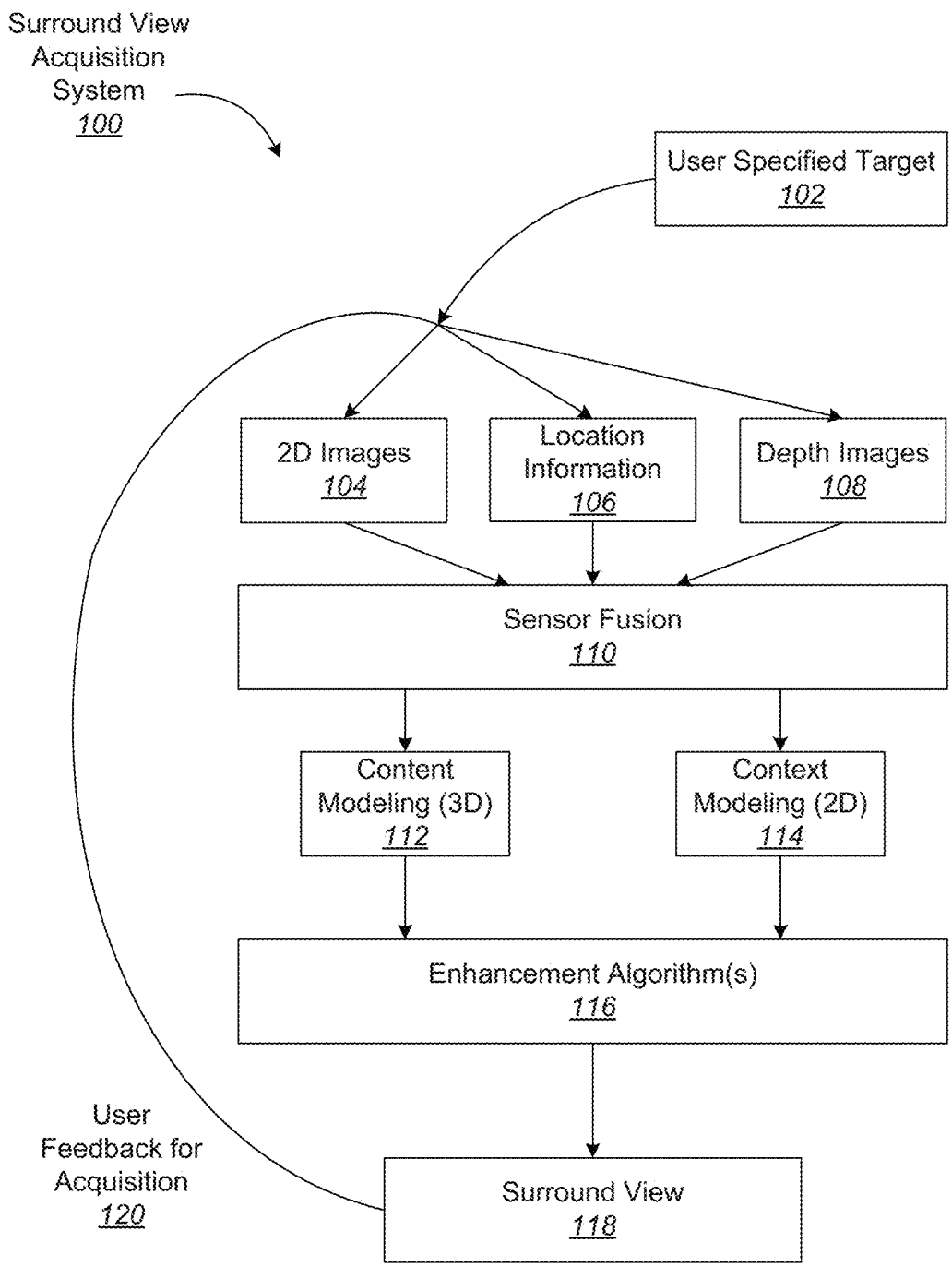
FIG. 1 illustrates an example of a surround view acquisition system.

Reference will now be made in detail to some specific examples of the disclosure including the best modes contemplated by the inventors for carrying out the disclosure. Examples of these specific embodiments are illustrated in the accompanying drawings. While the present disclosure is described in conjunction with these specific embodiments, it will be understood that it is not intended to limit the disclosure to the described embodiments. On the contrary, it is intended to cover alternatives, modifications, and equivalents as may be included within the spirit and scope of the disclosure as defined by the appended claims.

In the following description, numerous specific details are set forth in order to provide a thorough understanding of the present disclosure. Particular embodiments of the present disclosure may be implemented without some or all of these specific details. In other instances, well known process operations have not been described in detail in order not to unnecessarily obscure the present disclosure.

Various systems and methods for analyzing the spatial relationship between multiple images and video together with location information data, for the purpose of creating a single representation, a surround view, which eliminates redundancy in the data, and presents a user with an interactive and immersive active viewing experience, is described in U.S. patent application Ser. No. 14/530,669 by Holzer et al., filed on Oct. 31, 2014, titled ANALYSIS AND MANIPULATION OF IMAGES AND VIDEO FOR GENERATION OF SURROUND VIEWS, which is incorporated by reference herein in its entirety and for all purposes. According to various embodiments described therein, a surround view provides a user with the ability to control the viewpoint of the visual information displayed on a screen.

Various systems and methods for rendering artificial intermediate images through view interpolation of one or more existing images, for the purpose creating missing frames for improved viewing experience, is described in U.S. patent application Ser. No. 14/800,638 by Holzer et al., filed on Jul. 15, 2015, titled ARTIFICIALLY RENDERING IMAGES USING INTERPOLATION OF TRACKED CONTROL POINTS, and U.S. patent application Ser. No. 14/860,983 by Holzer et al., filed on Sep. 22, 2015, titled ARTIFICIALLY RENDERING IMAGES USING VIEWPOINT INTERPOLATION AND EXTRAPOLATION, both of which re incorporated by reference herein in their entirety and for all purposes. Various systems and methods for determining parameters for interpolation of image sequences on-the-fly during runtime are described in U.S. patent application Ser. No. 15/425,983 titled SYSTEM AND METHOD FOR INFINITE SMOOTHING OF IMAGE SEQUENCES by Holzer et al., filed on Feb. 6, 2017, which application is incorporated by reference herein in its entirety and for all purposes. According to various embodiments described therein, artificial images may be interpolated and used as one or more frames in a stereo pair of image frames.

Overview

According to various embodiments, a surround view is a multi-view interactive digital media representation. The data used to generate a surround view can come from a variety of sources. In particular, data such as, but not limited to, two-dimensional (2D) images can be used to generate a surround view. Such 2D images may be captured by a camera moving along a camera translation, which may or may not be uniform. The 2D images may be captured a constant intervals of time and/or distance of camera translation.

These 2D images can include color image data streams such as multiple image sequences, video data, etc., or multiple images in any of various formats for images, depending on the application. Another source of data that can be used to generate a surround view includes location information. This location information can be obtained from sources such as accelerometers, gyroscopes, magnetometers, GPS, WiFi, IMU-like systems (Inertial Measurement Unit systems), and the like. Yet another source of data that can be used to generate a surround view can include depth images. These depth images can include depth, 3D, or disparity image data streams, and the like, and can be captured by devices such as, but not limited to, stereo cameras, time-of-flight cameras, three-dimensional cameras, and the like.

In the present example embodiment, the data can then be fused together. In some embodiments, a surround view can be generated by a combination of data that includes both 2D images and location information, without any depth images provided. In other embodiments, depth images and location information can be used together. Various combinations of image data can be used with location information, depending on the application and available data.

In the present example embodiment, the data that has been fused together is then used for content modeling and context modeling. According to various examples, the subject matter featured in the images can be separated into content and context. The content can be delineated as the object of interest and the context can be delineated as the scenery surrounding the object of interest. According to various embodiments, the content can be presented as a three-dimensional model, depicting an object of interest, although the content can be a two-dimensional image in some embodiments. Furthermore, in some embodiments, the context can be presented as a two-dimensional model depicting the scenery surrounding the object of interest. Although in many examples the context can provide two-dimensional views of the scenery surrounding the object of interest, the context can also include three-dimensional aspects in some embodiments. For instance, the context can be depicted as a "flat" image along a cylindrical "canvas," such that the "flat" image appears on the surface of a cylinder. In addition, some examples may include three-dimensional context models, such as when some objects are identified in the surrounding scenery as three-dimensional objects. In various embodiments, the models provided by content modeling and context modeling can be generated by combining the image and location information data.

In the present example embodiment, one or more enhancement algorithms can be applied. In particular example embodiments, various algorithms can be employed during capture of surround view data, regardless of the type of capture mode employed. These algorithms can be used to enhance the user experience. For instance, automatic frame selection, stabilization, view interpolation, image rotation, infinite smoothing, filters, and/or compression can be used during capture of surround view data. In some examples, these enhancement algorithms can be applied to image data after acquisition of the data. In other examples, these enhancement algorithms can be applied to image data during capture of surround view data.

For example, view interpolation can be used to improve the viewing experience. In particular, to avoid sudden "jumps" between stabilized frames, synthetic, intermediate views can be rendered on the fly. This can be informed by content-weighted keypoint tracks and IMU information, as well as by denser pixel-to-pixel matches. If depth information is available, fewer artifacts resulting from mismatched pixels may occur, thereby simplifying the process. As described above, view interpolation can be applied during capture of a surround view in some embodiments. In other embodiments, view interpolation can be applied during surround view generation.

According to various embodiments, surround views provide numerous advantages over traditional two-dimensional images or videos. Some of these advantages include: the ability to cope with moving scenery, a moving acquisition device, or both; the ability to model parts of the scene in three-dimensions; the ability to remove unnecessary, redundant information and reduce the memory footprint of the output dataset; the ability to distinguish between content and context; the ability to use the distinction between content and context for improvements in the user-experience; the ability to use the distinction between content and context for improvements in memory footprint (an example would be high quality compression of content and low quality compression of context); the ability to associate special feature descriptors with surround views that allow the surround views to be indexed with a high degree of efficiency and accuracy; and the ability of the user to interact and change the viewpoint of the surround view. In particular example embodiments, the characteristics described above can be incorporated natively in the surround view representation, and provide the capability for use in various applications. For instance, surround views can be used to enhance various fields such as e-commerce, visual search, 3D printing, file sharing, user interaction, and entertainment.

According to various embodiments, stereoscopic pairs (stereo pairs) of image frames of the surround view may be presented to the user such that the user may perceive depth within the 3D surround view, and add to the user experience when viewing a 3D surround view. As used herein, the term stereoscopic pairs may be used interchangeably with the term stereo pairs. The image frames within each stereoscopic pair may correspond to a 2D image used to create the surround view. The image frames within each stereoscopic pair may be a set of 2D images that are separated by a predetermined spatial baseline. Such baseline may be determined based on a predetermined angle of vergence at a particular focal point and the distance from the focal point. View interpolation algorithms may also be used to render synthetic, intermediate views to create the appropriate stereo pair for a particular image frame. Such view interpolation algorithms may rotate the image plane for various objects, content, and/or context as needed on the fly based on camera location data and IMU data.

Image rotation may also be used to correct one or more images within the stereo pair. In order for the user to perceive depth, the view of each frame must be angled toward the object of interest. Image rotation causes the line of site to a desired focal point to be perpendicular to the image frame. In some embodiments, certain portions of the image of a frame may be rotated more or less than other portions of that image. For example, portions identified as context with a focal point at infinity may be rotated less than a nearby object identified as the content with a closer focal point. Such image rotation may utilize a Kanade-Lucas-Tomasi (KLT) feature tracker to track keypoints between the two image frames along with IMU data captured along with the images. Such image rotation may be performed by systems and methods as described in the U.S. patent application Ser. No. 14/408,270 titled STABILIZING IMAGE SEQUENCES BASED ON CAMERA ROTATION AND FOCAL LENGTH PARAMETERS by Holzer et al., filed on Jan. 17, 2017, which application is incorporated by reference herein in its entirety and for all purposes.

As such, stereoscopic pairs of frames may be generated on the fly from existing images captured by a single image view. Thus, experience of depth can be provided without storage of additional images, as required by existing methods. Furthermore, stereoscopic pairs of images generated by methods described herein may include optically correct physical rotations, which provide the user with a more realistic and undistorted stereoscopic view of the image.

Example Embodiments

According to various embodiments of the present disclosure, a surround view is a multi-view interactive digital media representation. With reference to FIG. 1, shown is one example of a surround view acquisition system 100. In the present example embodiment, the surround view acquisition system 100 is depicted in a flow sequence that can be used to generate a surround view. According to various embodiments, the data used to generate a surround view can come from a variety of sources. In particular, data such as, but not limited to two-dimensional (2D) images 104 can be used to generate a surround view. These 2D images can include color image data streams such as multiple image sequences, video data, etc., or multiple images in any of various formats for images, depending on the application. Another source of data that can be used to generate a surround view includes location information 106. This location information 106 can be obtained from sources such as accelerometers, gyroscopes, magnetometers, GPS, WiFi, IMU-like systems (Inertial Measurement Unit systems), and the like. Yet another source of data that can be used to generate a surround view can include depth images 108. These depth images can include depth, 3D, or disparity image data streams, and the like, and can be captured by devices such as, but not limited to, stereo cameras, time-of-flight cameras, three-dimensional cameras, and the like.

In the present example embodiment, the data can then be fused together at sensor fusion block 110. In some embodiments, a surround view can be generated a combination of data that includes both 2D images 104 and location information 106, without any depth images 108 provided. In other embodiments, depth images 108 and location information 106 can be used together at sensor fusion block 110. Various combinations of image data can be used with location information at 106, depending on the application and available data.

In the present example embodiment, the data that has been fused together at sensor fusion block 110 is then used for content modeling 112 and context modeling 114. As described in more detail with regard to FIG. 4, the subject matter featured in the images can be separated into content and context. The content can be delineated as the object of interest and the context can be delineated as the scenery surrounding the object of interest. According to various embodiments, the content can be a three-dimensional model, depicting an object of interest, although the content can be a two-dimensional image in some embodiments, as described in more detail below with regard to FIG. 4. Furthermore, in some embodiments, the context can be a two-dimensional model depicting the scenery surrounding the object of interest. Although in many examples the context can provide two-dimensional views of the scenery surrounding the object of interest, the context can also include three-dimensional aspects in some embodiments. For instance, the context can be depicted as a "flat" image along a cylindrical "canvas," such that the "flat" image appears on the surface of a cylinder. In addition, some examples may include three-dimensional context models, such as when some objects are identified in the surrounding scenery as three-dimensional objects. According to various embodiments, the models provided by content modeling 112 and context modeling 114 can be generated by combining the image and location information data, as described in more detail with regard to FIG. 3.

According to various embodiments, context and content of a surround view are determined based on a specified object of interest. In some examples, an object of interest is automatically chosen based on processing of the image and location information data. For instance, if a dominant object is detected in a series of images, this object can be selected as the content. In other examples, a user specified target 102 can be chosen, as shown in FIG. 1. It should be noted, however, that a surround view can be generated without a user specified target in some applications.

In the present example embodiment, one or more enhancement algorithms can be applied at enhancement algorithm(s) block 116. In particular example embodiments, various algorithms can be employed during capture of surround view data, regardless of the type of capture mode employed. These algorithms can be used to enhance the user experience. For instance, automatic frame selection, stabilization, view interpolation, image rotation, infinite smoothing, filters, and/or compression can be used during capture of surround view data. In some examples, these enhancement algorithms can be applied to image data after acquisition of the data. In other examples, these enhancement algorithms can be applied to image data during capture of surround view data.

According to particular example embodiments, automatic frame selection can be used to create a more enjoyable surround view. Specifically, frames are automatically selected so that the transition between them will be smoother or more even. This automatic frame selection can incorporate blur- and overexposure-detection in some applications, as well as more uniformly sampling poses such that they are more evenly distributed.

In some example embodiments, stabilization can be used for a surround view in a manner similar to that used for video. In particular, keyframes in a surround view can be stabilized to produce improvements such as smoother transitions, improved/enhanced focus on the content, etc. However, unlike video, there are many additional sources of stabilization for a surround view, such as by using IMU information, depth information, computer vision techniques, direct selection of an area to be stabilized, face detection, and the like.

For instance, IMU information can be very helpful for stabilization. In particular, IMU information provides an estimate, although sometimes a rough or noisy estimate, of the camera tremor that may occur during image capture. This estimate can be used to remove, cancel, and/or reduce the effects of such camera tremor.

In some examples, depth information, if available, can be used to provide stabilization for a surround view. Because points of interest in a surround view are three-dimensional, rather than two-dimensional, these points of interest are more constrained and tracking/matching of these points is simplified as the search space reduces. Furthermore, descriptors for points of interest can use both color and depth information and therefore, become more discriminative. In addition, automatic or semi-automatic content selection can be easier to provide with depth information. For instance, when a user selects a particular pixel of an image, this selection can be expanded to fill the entire surface that touches it. Furthermore, content can also be selected automatically by using a foreground/background differentiation based on depth. In various examples, the content can stay relatively stable/visible even when the context changes.

According to various examples, computer vision techniques can also be used to provide stabilization for surround views. For instance, keypoints can be detected and tracked. However, in certain scenes, such as a dynamic scene or static scene with parallax, no simple warp exists that can stabilize everything. Consequently, there is a trade-off in which certain aspects of the scene receive more attention to stabilization and other aspects of the scene receive less attention. Because a surround view is often focused on a particular object of interest, a surround view can be content-weighted so that the object of interest is maximally stabilized in some examples.

Another way to improve stabilization in a surround view includes direct selection of a region of a screen. For instance, if a user taps to focus on a region of a screen, then records a convex surround view, the area that was tapped can be maximally stabilized. This allows stabilization algorithms to be focused on a particular area or object of interest.

In some examples, face detection can be used to provide stabilization. For instance, when recording with a front-facing camera, it is often likely that the user is the object of interest in the scene. Thus, face detection can be used to weight stabilization about that region. When face detection is precise enough, facial features themselves (such as eyes, nose, mouth) can be used as areas to stabilize, rather than using generic keypoints.

According to various examples, view interpolation can be used to improve the viewing experience. In particular, to avoid sudden "jumps" between stabilized frames, synthetic, intermediate views can be rendered on the fly. This can be informed by content-weighted keypoint tracks and IMU information as described above, as well as by denser pixel-to-pixel matches. If depth information is available, fewer artifacts resulting from mismatched pixels may occur, thereby simplifying the process. As described above, view interpolation can be applied during capture of a surround view in some embodiments. In other embodiments, view interpolation can be applied during surround view generation.

In some examples, view interpolation may be implemented as infinite smoothing, which may also be used to improve the viewing experience by creating a smoother transition between displayed frames, which may be actual or interpolated, as described above. Infinite smoothing may include determining a predetermined amount of possible transformations between frames. A Harris corner detector algorithm may be implemented to detect salient features to designate as keypoints in each frame, such as areas of large contrast, areas with minimum ambiguity in different dimensions, and/or areas with high cornerness. A predetermined number keypoints with the highest Harris score may then be selected. A RANSAC (random sample consensus) algorithm may then be implemented to determine a number of the most common occurring transformations possible based on all possible transformations of the keypoints between frames. For example, a smooth flow space of eight possible transformations and/or motions for various pixels between frames may be discretized. Different transformations may be assigned to different pixels in a frame. Such keypoint detection, keypoint tracking, and RANSAC algorithms may be run offline. In some embodiments, infinite smoothing algorithms may be run in real time on the fly. For example, as the user navigate to a particular translation position, and if that translation position does not already correspond to an existing and/or captured image frame, the system may generate an appropriate artificial image frame corresponding to the particular translation position using the optimal transformation chosen from the possible transformation candidates.

In some examples, filters can also be used during capture or generation of a surround view to enhance the viewing experience. Just as many popular photo sharing services provide aesthetic filters that can be applied to static, two-dimensional images, aesthetic filters can similarly be applied to surround images. However, because a surround view representation is more expressive than a two-dimensional image, and three-dimensional information is available in a surround view, these filters can be extended to include effects that are ill-defined in two dimensional photos. For instance, in a surround view, motion blur can be added to the background (i.e. context) while the content remains crisp. In another example, a drop-shadow can be added to the object of interest in a surround view.

In various examples, compression can also be used as an enhancement algorithm 116. In particular, compression can be used to enhance user-experience by reducing data upload and download costs. Because surround views use spatial information, far less data can be sent for a surround view than a typical video, while maintaining desired qualities of the surround view. Specifically, the IMU, keypoint tracks, and user input, combined with the view interpolation described above, can all reduce the amount of data that must be transferred to and from a device during upload or download of a surround view. For instance, if an object of interest can be properly identified, a variable compression style can be chosen for the content and context. This variable compression style can include lower quality resolution for background information (i.e. context) and higher quality resolution for foreground information (i.e. content) in some examples. In such examples, the amount of data transmitted can be reduced by sacrificing some of the context quality, while maintaining a desired level of quality for the content.

In the present embodiment, a surround view 118 is generated after any enhancement algorithms are applied. The surround view can provide a multi-view interactive digital media representation. In various examples, the surround view can include three-dimensional model of the content and a two-dimensional model of the context. However, in some examples, the context can represent a "flat" view of the scenery or background as projected along a surface, such as a cylindrical or other-shaped surface, such that the context is not purely two-dimensional. In yet other examples, the context can include three-dimensional aspects.

According to various embodiments, surround views provide numerous advantages over traditional two-dimensional images or videos. Some of these advantages include: the ability to cope with moving scenery, a moving acquisition device, or both; the ability to model parts of the scene in three-dimensions; the ability to remove unnecessary, redundant information and reduce the memory footprint of the output dataset; the ability to distinguish between content and context; the ability to use the distinction between content and context for improvements in the user-experience; the ability to use the distinction between content and context for improvements in memory footprint (an example would be high quality compression of content and low quality compression of context); the ability to associate special feature descriptors with surround views that allow the surround views to be indexed with a high degree of efficiency and accuracy; and the ability of the user to interact and change the viewpoint of the surround view. In particular example embodiments, the characteristics described above can be incorporated natively in the surround view representation, and provide the capability for use in various applications. For instance, surround views can be used to enhance various fields such as e-commerce, visual search, 3D printing, file sharing, user interaction, and entertainment.

According to various example embodiments, once a surround view 118 is generated, user feedback for acquisition 120 of additional image data can be provided. In particular, if a surround view is determined to need additional views to provide a more accurate model of the content or context, a user may be prompted to provide additional views. Once these additional views are received by the surround view acquisition system 100, these additional views can be processed by the system 100 and incorporated into the surround view.

Figure 2:
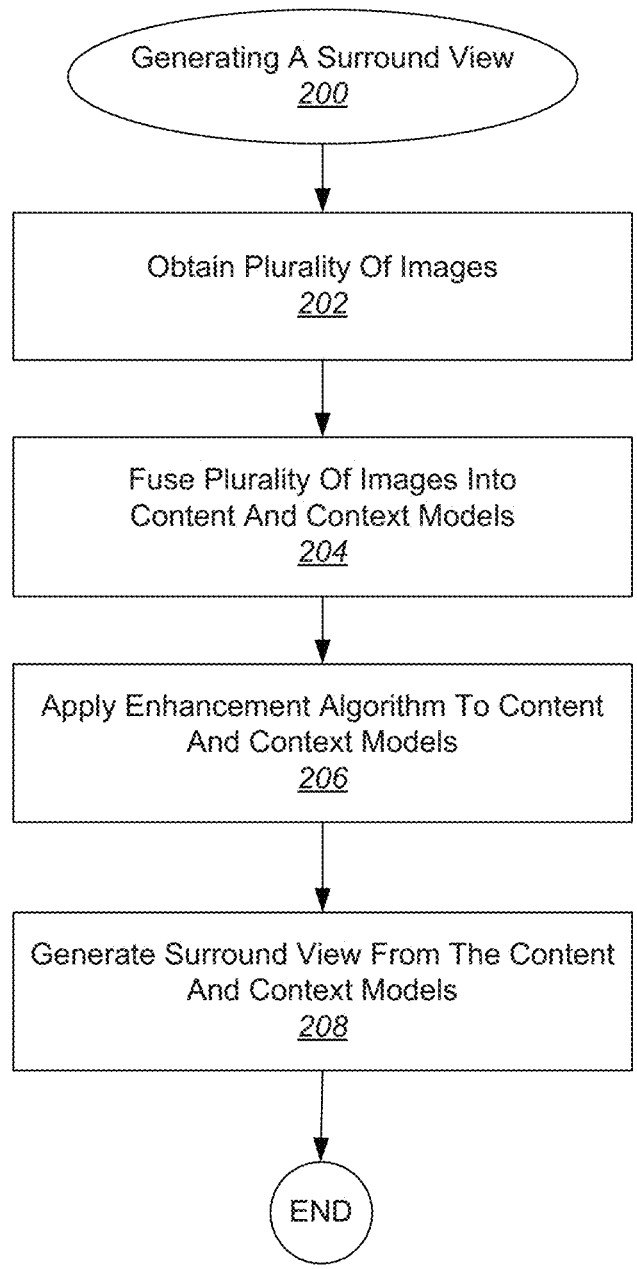
FIG. 2 illustrates an example of a process flow for generating a surround view.

With reference to FIG. 2, shown is an example of a process flow diagram for generating a surround view 200. In the present example, a plurality of images is obtained at 202. According to various embodiments, the plurality of images may be various types of images obtained by various types of cameras. For example, a camera may be a digital camera in a continuous shooting mode (or burst mode) configured to capture a number of frames in a certain amount of time, such as five frames per second. In other embodiments, the camera may be a camera on a smartphone. In some embodiments, the camera may be configured to capture the plurality of images as a continuous video.

According to various embodiments, the plurality of images can include two-dimensional (2D) images or data streams. These 2D images can include location information that can be used to generate a surround view. In some embodiments, the plurality of images can include depth images 108, as also described above with regard to FIG. 1. The depth images can also include location information in various examples.

According to various embodiments, the plurality of images obtained at 202 can include a variety of sources and characteristics. For instance, the plurality of images can be obtained from a plurality of users. These images can be a collection of images gathered from the internet from different users of the same event, such as 2D images or video obtained at a concert, etc. In some examples, the plurality of images can include images with different temporal information. In particular, the images can be taken at different times of the same object of interest. For instance, multiple images of a particular statue can be obtained at different times of day, different seasons, etc. In other examples, the plurality of images can represent moving objects. For instance, the images may include an object of interest moving through scenery, such as a vehicle traveling along a road or a plane traveling through the sky. In other instances, the images may include an object of interest that is also moving, such as a person dancing, running, twirling, etc.

In the present example embodiment, the plurality of images is fused into content and context models at 204. According to various embodiments, the subject matter featured in the images can be separated into content and context. The content can be delineated as the object of interest and the context can be delineated as the scenery surrounding the object of interest. According to various embodiments, the content can be a three-dimensional model, depicting an object of interest, and the content can be a two-dimensional image in some embodiments.

According to the present example embodiment, one or more enhancement algorithms can be applied to the content and context models at 206. These algorithms can be used to enhance the user experience. For instance, enhancement algorithms such as automatic frame selection, stabilization, view interpolation, image rotation, infinite smoothing, filters, and/or compression can be used. In some examples, these enhancement algorithms can be applied to image data during capture of the images. In other examples, these enhancement algorithms can be applied to image data after acquisition of the data.

In the present embodiment, a surround view is generated from the content and context models at 208. The surround view can provide a multi-view interactive digital media representation. In various examples, the surround view can include a three-dimensional model of the content and a two-dimensional model of the context. According to various embodiments, depending on the mode of capture and the viewpoints of the images, the surround view model can include certain characteristics. For instance, some examples of different styles of surround views include a locally concave surround view, a locally convex surround view, and a locally flat surround view. However, it should be noted that surround views can include combinations of views and characteristics, depending on the application. In some embodiments, the surround view model is not an actual three-dimensional model that is rendered, but a three-dimensional view experienced as a three-dimensional model by the user. For example, the surround view provides a three-dimensional view of the content without rendering and/or storing an actual three-dimensional model. In other words, there is no polygon generation or texture mapping over a three-dimensional mesh and/or polygon model. However, the user still perceives the content and/or context as an actual three-dimensional model. The three-dimensional effect provided by the surround view is generated simply through stitching of actual two-dimensional images and/or portions thereof. As used herein, the term "three-dimensional model" is used interchangeably with this type of three-dimensional view.

Figure 3:
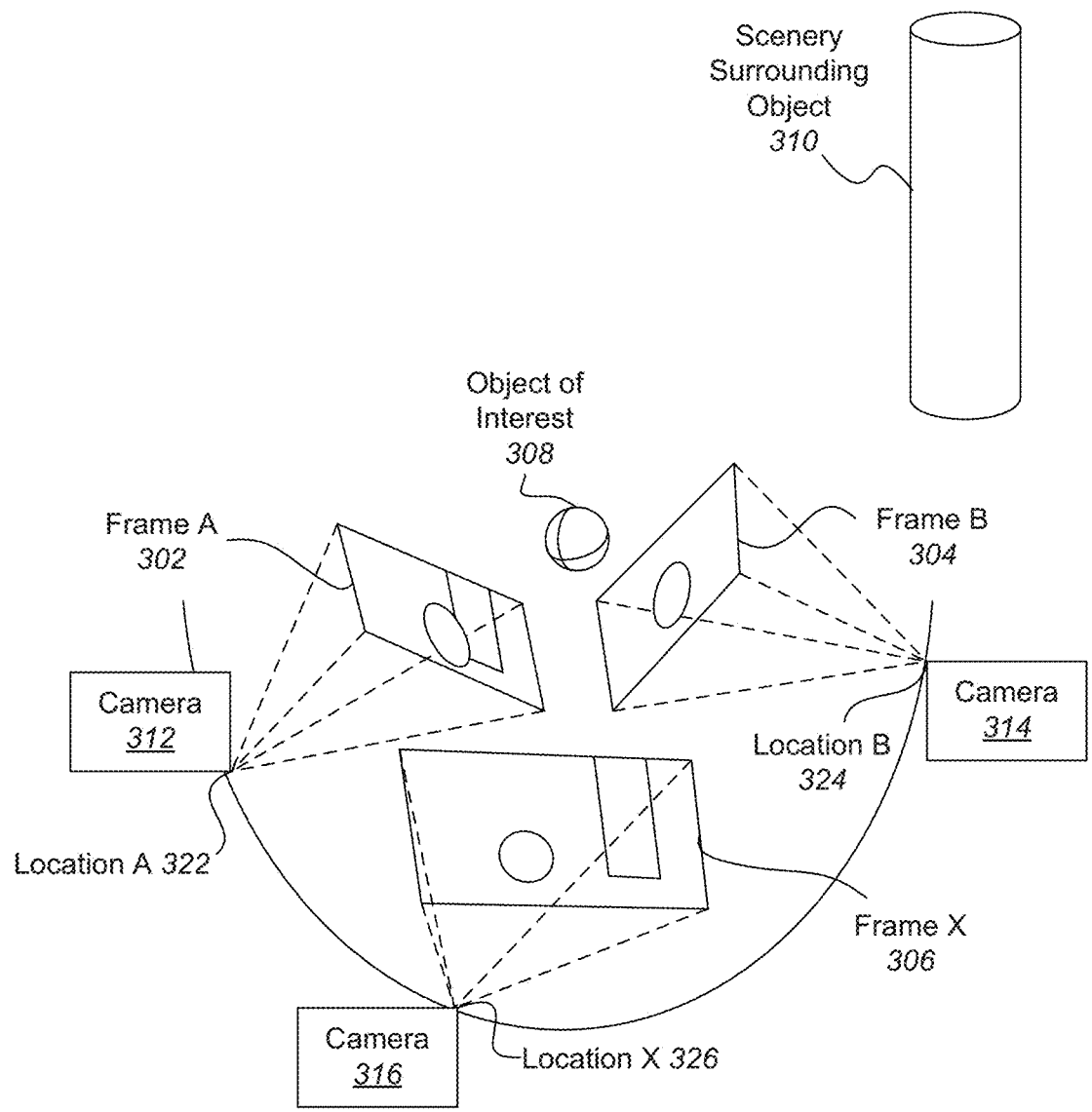
FIG. 3 illustrates one example of multiple camera views that can be fused into a three-dimensional (3D) model to create an immersive experience.

With reference to FIG. 3, shown is one example of multiple camera frames that can be fused together into a three-dimensional (3D) model to create an immersive experience. According to various embodiments, multiple images can be captured from various viewpoints and fused together to provide a surround view. In the present example embodiment, three cameras 312, 314, and 316 are positioned at location A 322, location B 324, and location X 326, respectively, in proximity to an object of interest 308. Scenery can surround the object of interest 308 such as object 310. Frame A 302, frame B 304, and frame X 306 from their respective cameras 312, 314, and 316 include overlapping subject matter. Specifically, each frame 302, 304, and 306 includes the object of interest 308 and varying degrees of visibility of the scenery surrounding the object 310. For instance, frame A 302 includes a view of the object of interest 308 in front of the cylinder that is part of the scenery surrounding the object 310. View 306 shows the object of interest 308 to one side of the cylinder, and view 304 shows the object of interest without any view of the cylinder.

In the present example embodiment, the various frames, frame A 302, frame B 304, and frame X 316, along with their associated locations, location A 322, location B 324, and location X 326, respectively, provide a rich source of information about object of interest 308 and the surrounding context that can be used to produce a surround view. For instance, when analyzed together, the various frames 302, 304, and 326 provide information about different sides of the object of interest and the relationship between the object of interest and the scenery. According to various embodiments, this information can be used to parse out the object of interest 308 into content and the scenery as the context. Furthermore, as also described above with regard to FIGS. 1 and 2, various algorithms can be applied to images produced by these viewpoints to create an immersive, interactive experience when viewing a surround view.

In some embodiments Frame X 306 may be an artificially rendered image that is generated for a viewpoint at Location X 326 on a trajectory between Location A 322 and Location B 324. In such example, a single transform for viewpoint interpolation is used along the trajectory between two frames, Frame A 302 and Frame B 304. As previously described, Frame A 302 represents an image captured of objects 108 and 110 by a camera 112 located at Location A 122. Frame B 104 represents an image captured of object 108 by a camera 114 located at Location B 124. In the present example, the transformation (T_AB) is estimated between the two frames, where T_AB maps a pixel from frame A to frame B. This transformation is performed using methods such as homography, affine, similarity, translation, rotation, or scale.

In the present example, an artificially rendered image at Location X 126, which can also be denoted as a viewpoint position at x \in [0, 1] on the trajectory between frame A and B, where frame A is located at 0 and frame B at 1, is then generated by interpolating the transformation, gathering image information from Frames A and B, and combining the image information. In the present example, the transformation is interpolated (T_AX and T_XB). One way to interpolate this transformation is to parameterize the transformation T_AB and linearly interpolate those parameters. However, this interpolation is not limited to linear interpolations and other methods can be used within the scope of this disclosure. Next, image information is gathered from both Frames A and B by transferring image information from Frame A 102 to Frame X 106 based on T_AX and by transferring image information from Frame B 104 to Frame X 106 based on T_XB. Finally, the image information gathered from both Frames A and B is combined to generate an artificially rendered image at Location X 126. Interpolation to render artificial frames is further described below with references to FIGS. 13-20.

Figure 4:
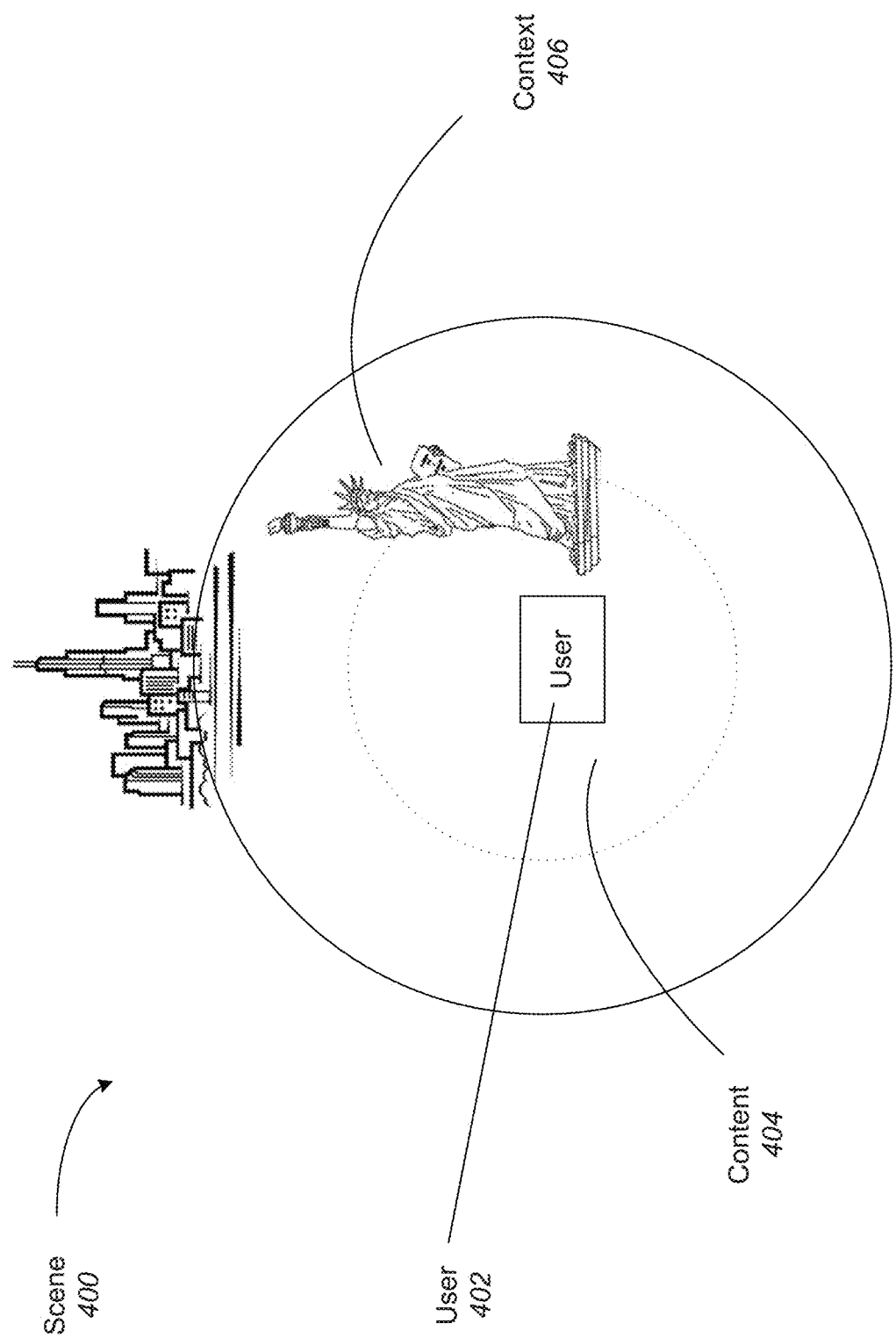
FIG. 4 illustrates one example of separation of content and context in a surround view.

FIG. 4 illustrates one example of separation of content and context in a surround view. According to various embodiments of the present disclosure, a surround view is a multi-view interactive digital media representation of a scene 400. With reference to FIG. 4, shown is a user 402 located in a scene 400. The user 402 is capturing images of an object of interest, such as a statue. The images captured by the user constitute digital visual data that can be used to generate a surround view.

According to various embodiments of the present disclosure, the digital visual data included in a surround view can be, semantically and/or practically, separated into content 404 and context 406. According to particular embodiments, content 404 can include the object(s), person(s), or scene(s) of interest while the context 406 represents the remaining elements of the scene surrounding the content 404. In some examples, a surround view may represent the content 404 as three-dimensional data, and the context 406 as a two-dimensional panoramic background. In other examples, a surround view may represent both the content 404 and context 406 as two-dimensional panoramic scenes. In yet other examples, content 404 and context 406 may include three-dimensional components or aspects. In particular embodiments, the way that the surround view depicts content 404 and context 406 depends on the capture mode used to acquire the images.

In some examples, such as but not limited to: recordings of objects, persons, or parts of objects or persons, where only the object, person, or parts of them are visible, recordings of large flat areas, and recordings of scenes where the data captured appears to be at infinity (i.e., there are no subjects close to the camera), the content 404 and the context 406 may be the same. In these examples, the surround view produced may have some characteristics that are similar to other types of digital media such as panoramas. However, according to various embodiments, surround views include additional features that distinguish them from these existing types of digital media. For instance, a surround view can represent moving data. Additionally, a surround view is not limited to a specific cylindrical, spherical or translational movement. Various motions can be used to capture image data with a camera or other capture device. Furthermore, unlike a stitched panorama, a surround view can display different sides of the same object.

FIGS. 5A-5B illustrate examples of concave and convex views, respectively, where both views use a back-camera capture style. In particular, if a camera phone is used, these views use the camera on the back of the phone, facing away from the user. In particular embodiments, concave and convex views can affect how the content and context are designated in a surround view.

With reference to FIG. 5A, shown is one example of a concave view 500 in which a user is standing along a vertical axis 508. In this example, the user is holding a camera, such that camera location 502 does not leave axis 508 during image capture. However, as the user pivots about axis 508, the camera captures a panoramic view of the scene around the user, forming a concave view. In this embodiment, the object of interest 504 and the distant scenery 506 are all viewed similarly because of the way in which the images are captured. In this example, all objects in the concave view appear at infinity, so the content is equal to the context according to this view.

With reference to FIG. 5B, shown is one example of a convex view 520 in which a user changes position when capturing images of an object of interest 524. In this example, the user moves around the object of interest 524, taking pictures from different sides of the object of interest from camera locations 528, 530, and 532. Each of the images obtained includes a view of the object of interest, and a background of the distant scenery 526. In the present example, the object of interest 524 represents the content, and the distant scenery 526 represents the context in this convex view.

FIGS. 6A-6E illustrate examples of various capture modes for surround views. Although various motions can be used to capture a surround view and are not constrained to any particular type of motion, three general types of motion can be used to capture particular features or views described in conjunction surround views. These three types of motion, respectively, can yield a locally concave surround view, a locally convex surround view, and a locally flat surround view. In some examples, a surround view can include various types of motions within the same surround view. As described with reference to FIGS. 6A-6E, the type of surround view (for example, concave or convex) is described with reference to the direction of the camera view.

Figure 6A:
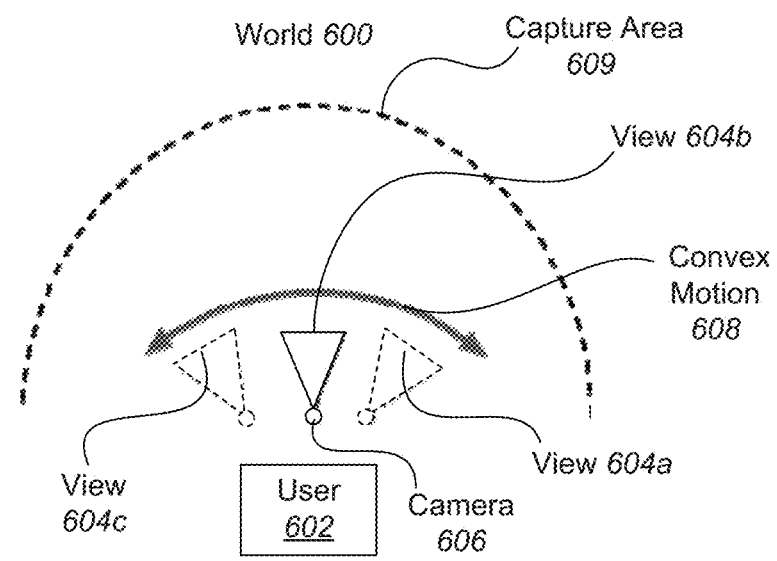
FIGS. 6A-6E illustrate examples of various capture modes for surround views.

With reference to FIG. 6A, shown is an example of a back-facing, convex surround view being captured. According to various embodiments, a locally convex surround view is one in which the viewing angles of the camera or other capture device diverge. In one dimension this can be likened to the motion required to capture a spherical 360 panorama (pure rotation), although the motion can be generalized to any curved sweeping motion in which the view faces outward. In the present example, the experience is that of a stationary viewer looking out at a (possibly dynamic) context.

In the present example embodiment, a user 602 is using a back-facing camera 606 to capture images towards world 600, and away from user 602. As described in various examples, a back-facing camera refers to a device with a camera that faces away from the user, such as the camera on the back of a smart phone. The camera is moved in a concave motion 608, such that views 604*a*, 604*b*, and 604*c* capture various parts of capture area 609.

Figure 6B:
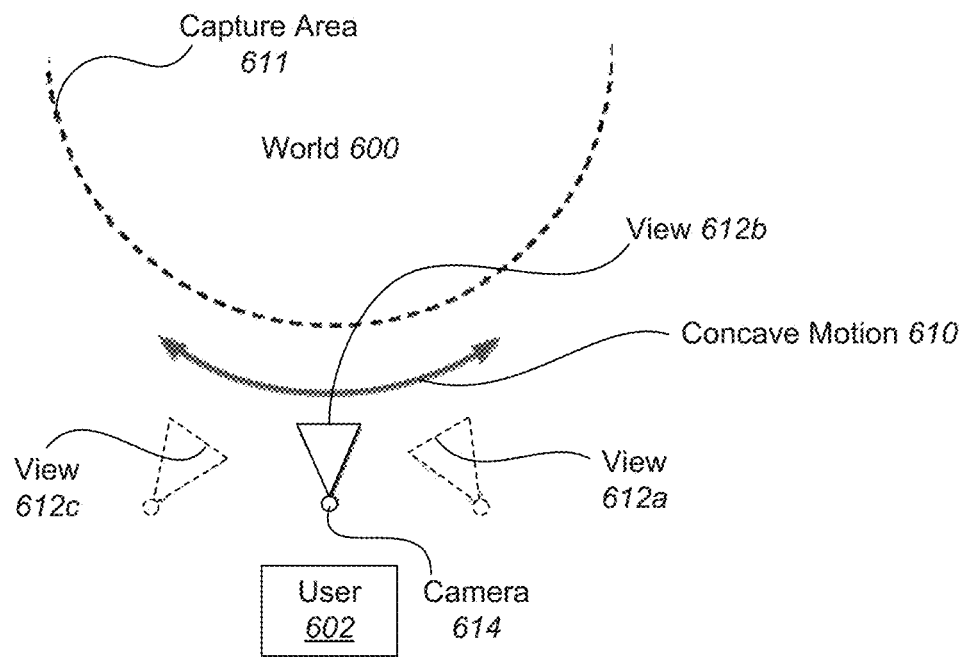

With reference to FIG. 6B, shown is an example of a back-facing, concave surround view being captured. According to various embodiments, a locally concave surround view is one in which viewing angles converge toward a single object of interest. In some examples, a locally concave surround view can provide the experience of orbiting about a point, such that a viewer can see multiple sides of the same object. This object, which may be an "object of interest," can be segmented from the surround view to become the content, and any surrounding data can be segmented to become the context. Previous technologies fail to recognize this type of viewing angle in the media-sharing landscape.

In the present example embodiment, a user 602 is using a back-facing camera 614 to capture images towards world 600, and away from user 602. The camera is moved in a concave motion 610, such that views 612*a*, 612*b*, and 612*c* capture various parts of capture area 611. As described above, world 600 can include an object of interest in some examples, and the convex motion 610 can orbit around this object. Views 612*a*, 612*b*, and 612*c* can include views of different sides of this object in these examples.

Figure 6C:
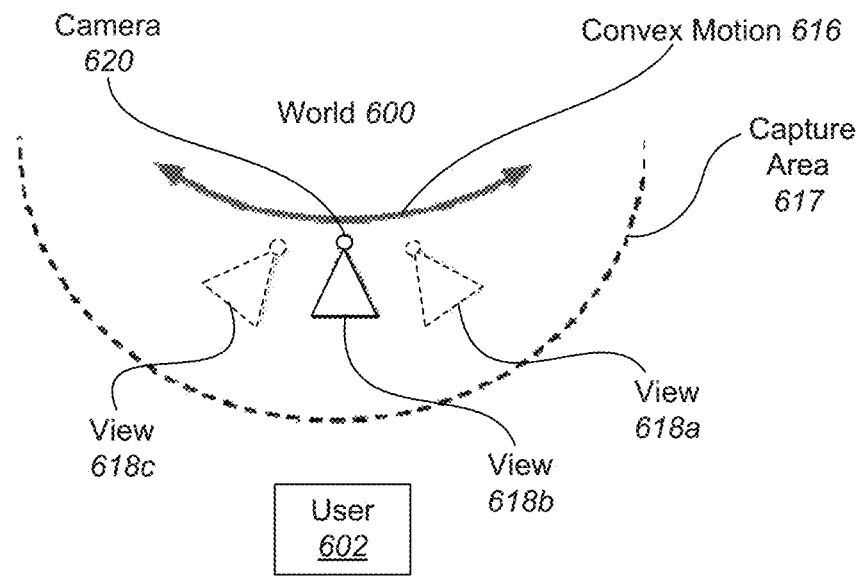

With reference to FIG. 6C, shown is an example of a front-facing, convex surround view being captured. As described in various examples, a front-facing camera refers to a device with a camera that faces towards the user, such as the camera on the front of a smart phone. For instance, front-facing cameras are commonly used to take "selfies" (i.e., self-portraits of the user).

In the present example embodiment, camera 620 is facing user 602. The camera follows a convex motion 606 such that the views 618*a*, 618*b*, and 618*c* diverge from each other in an angular sense. The capture area 617 follows a convex shape that includes the user at a perimeter.

Figure 6D:
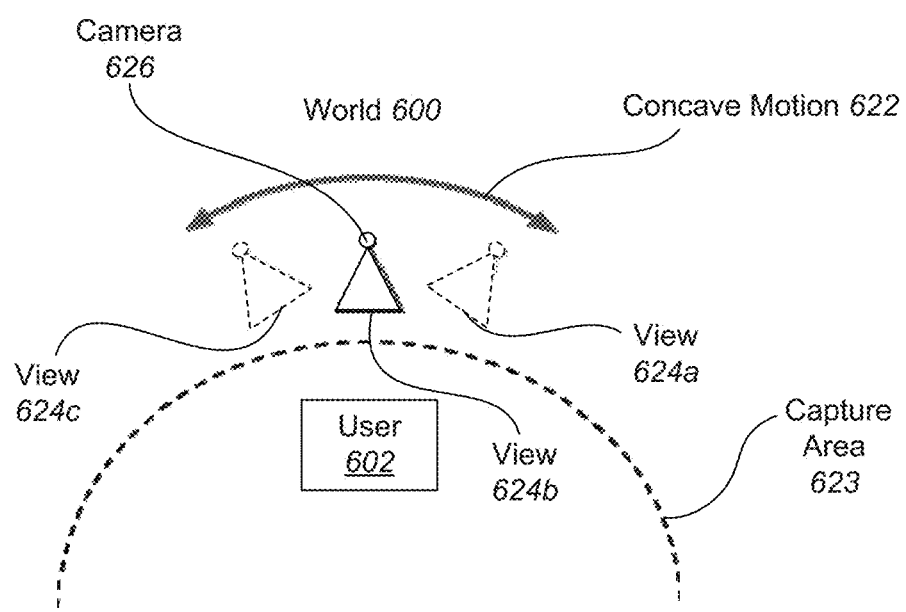

With reference to FIG. 6D, shown is an example of a front-facing, concave surround view being captured. In the present example embodiment, camera 626 is facing user 602. The camera follows a concave motion 622 such that the views 624*a*, 624*b*, and 624*c* converge towards the user 602. The capture area 623 follows a concave shape that surrounds the user 602.

Figure 6E:
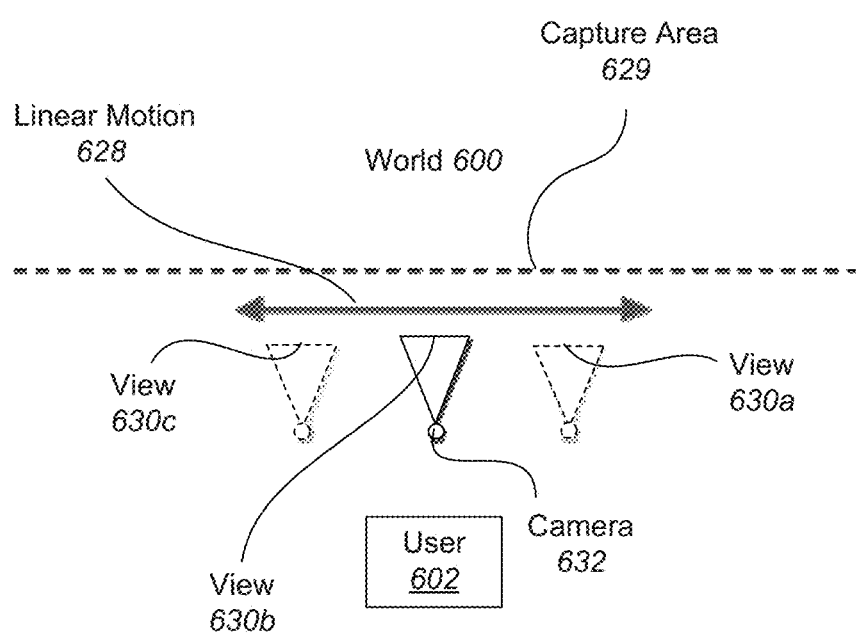

With reference to FIG. 6E, shown is an example of a back-facing, flat view being captured. In particular example embodiments, a locally flat surround view is one in which the rotation of the camera is small compared to its translation. In a locally flat surround view, the viewing angles remain roughly parallel, and the parallax effect dominates. In this type of surround view, there can also be an "object of interest", but its position does not remain fixed in the different views. Previous technologies also fail to recognize this type of viewing angle in the media-sharing landscape.

In the present example embodiment, camera 632 is facing away from user 602, and towards world 600. The camera follows a generally linear motion 628 such that the capture area 629 generally follows a line. The views 630*a*, 630*b*, and 630*c* have generally parallel lines of sight. An object viewed in multiple views can appear to have different or shifted background scenery in each view. In addition, a slightly different side of the object may be visible in different views. Using the parallax effect, information about the position and characteristics of the object can be generated in a surround view that provides more information than any one static image.

As described above, various modes can be used to capture images for a surround view. These modes, including locally concave, locally convex, and locally linear motions, can be used during capture of separate images or during continuous recording of a scene. Such recording can capture a series of images during a single session.

According to various embodiments of the present disclosure, a surround view can be generated from data acquired in numerous ways. For example, data may be acquired by moving a camera through space as described with reference to FIG. 7 of U.S. patent application Ser. No. 14/530,669. In particular, a user may tap a record button on a capture device to begin recording. As movement of the capture device follows a generally leftward direction, an object may move in a generally rightward motion across the screen. As the capture device moves leftward, the object appears to move rightward between subsequent views. In some examples, when the user is finished recording, the record button can be tapped again to end recording. In other examples, the user can tap and hold the record button during recording, and release to stop recording. In the present embodiment, the recording captures a series of images that can be used to generate a surround view.

Figure 7:
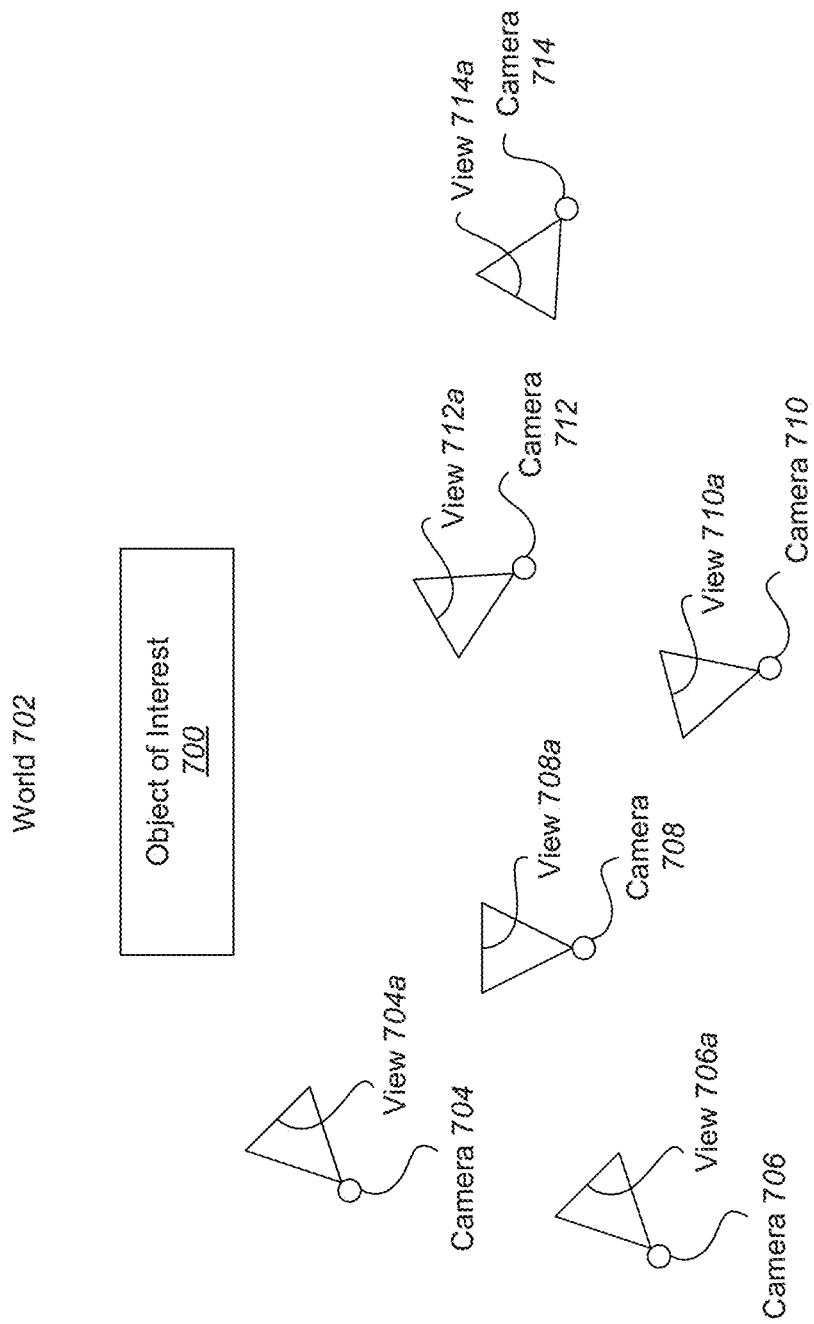
FIG. 7 illustrates one example of a space-time surround view being simultaneously recorded by independent observers.

According to various embodiments, a series of images used to generate a surround view can be captured by a user recording a scene, object of interest, etc. Additionally, in some examples, multiple users can contribute to acquiring a series of images used to generate a surround view. With reference to FIG. 7, shown is one example of a space-time surround view being simultaneously recorded by independent observers.

In the present example embodiment, cameras 704, 706, 708, 710, 712, and 714 are positioned at different locations. In some examples, these cameras 704, 706, 708, 710, 712, and 714 can be associated with independent observers. For instance, the independent observers could be audience members at a concert, show, event, etc. In other examples, cameras 704, 706, 708, 710, 712, and 714 could be placed on tripods, stands, etc. In the present embodiment, the cameras 704, 706, 708, 710, 712, and 714 are used to capture views 704*a*, 706*a*, 708*a*, 710*a*, 712*a*, and 714*a*, respectively, of an object of interest 700, with world 702 providing the background scenery. The images captured by cameras 704, 706, 708, 710, 712, and 714 can be aggregated and used together in a single surround view in some examples. Each of the cameras 704, 706, 708, 710, 712, and 714 provides a different vantage point relative to the object of interest 700, so aggregating the images from these different locations provides information about different viewing angles of the object of interest 700. In addition, cameras 704, 706, 708, 710, 712, and 714 can provide a series of images from their respective locations over a span of time, such that the surround view generated from these series of images can include temporal information and can also indicate movement over time.

As described above with regard to various embodiments, surround views can be associated with a variety of capture modes. In addition, a surround view can include different capture modes or different capture motions in the same surround view. Accordingly, surround views can be separated into smaller parts in some examples, such as described with reference to FIG. 10 of U.S. patent application Ser. No. 14/530,669. For example, a complex surround-view may be separated into smaller, linear parts. In some embodiments, a complex surround view may include a capture area that follows a sweeping L motion, which includes two separate linear motions of the camera. The surround views associated with these separate linear motions can be broken down into two separate surround views. It should be noted that although the linear motions of the complex surround view can be captured sequentially and continuously in some embodiments, such linear motions can also be captured in separate sessions in other embodiments.

In some embodiments, the two linear surround views can be processed independently, and joined with a transition to provide a continuous experience for the user. Breaking down motion into smaller linear components in this manner can provide various advantages. For instance, breaking down these smaller linear components into discrete, loadable parts can aid in compression of the data for bandwidth purposes. Similarly, non-linear surround views can also be separated into discrete components. In some examples, surround views can be broken down based on local capture motion. For example, a complex motion may be broken down into a locally convex portion and a linear portion. In another example, a complex motion can be broken down into separate locally convex portions. It should be recognized that any number of motions can be included in a complex surround view, and that such complex surround view can be broken down into any number of separate portions, depending on the application.

Figure 8:
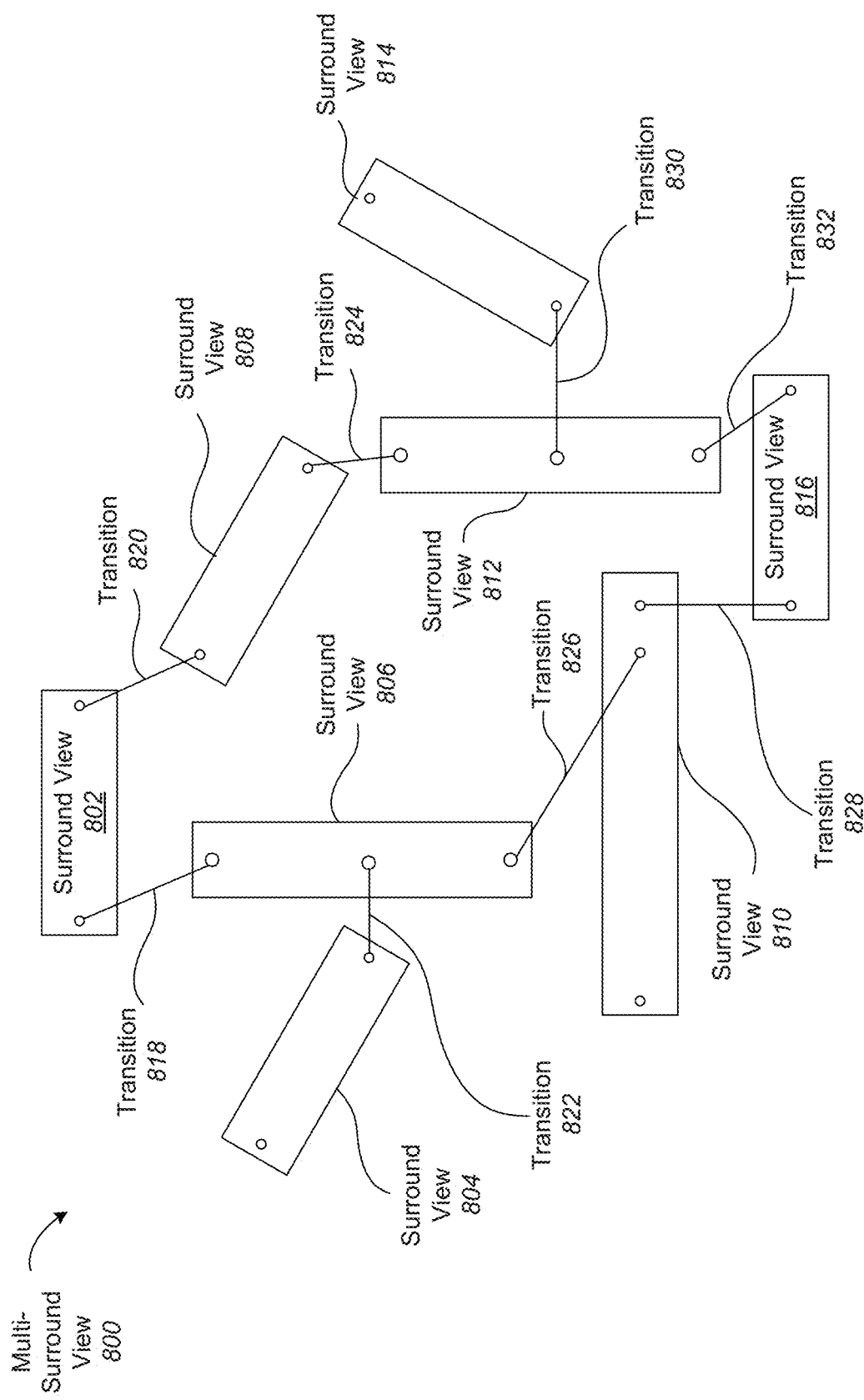
FIG. 8 illustrates one example of a combination of multiple surround views into a multi-surround view.

Although in some applications, it is desirable to separate complex surround views, in other applications it is desirable to combine multiple surround views. With reference to FIG. 8, shown is one example of a graph that includes multiple surround views combined into a multi-surround view 800. In this example, the rectangles represent various surround views 802, 804, 806, 808, 810, 812, 814, and 816, and the length of each rectangle indicates the dominant motion of each surround view. Lines between the surround views indicate possible transitions 818, 820, 822, 824, 826, 828, 830, and 832 between them.

In some examples, a surround view can provide a way to partition a scene both spatially and temporally in a very efficient manner. For very large scale scenes, multi-surround view 800 data can be used. In particular, a multi-surround view 800 can include a collection of surround views that are connected together in a spatial graph. The individual surround views can be collected by a single source, such as a single user, or by multiple sources, such as multiple users. In addition, the individual surround views can be captured in sequence, in parallel, or totally uncorrelated at different times. However, in order to connect the individual surround views, there must be some overlap of content, context, or location, or of a combination of these features. Accordingly, any two surround views would need to have some overlap in content, context, and/or location to provide a portion of a multi-surround view 800. Individual surround views can be linked to one another through this overlap and stitched together to form a multi-surround view 800. According to various examples, any combination of capture devices with either front, back, or front and back cameras can be used.

In some embodiments, multi-surround views 800 can be generalized to more fully capture entire environments. Much like "photo tours" collect photographs into a graph of discrete, spatially-neighboring components, multiple surround views can be combined into an entire scene graph. In some examples, this can be achieved using information obtained from but not limited to: image matching/tracking, depth matching/tracking, IMU, user input, and/or GPS. Within such a graph or multi-surround view, a user can switch between different surround views either at the end points of the recorded motion or wherever there is an overlap with other surround views in the graph. One advantage of multi-surround views over "photo tours" is that a user can navigate the surround views as desired and much more visual information can be stored in surround views. In contrast, traditional "photo tours" typically have limited views that can be shown to the viewer either automatically or by allowing the user to pan through a panorama with a computer mouse or keystrokes.

According to various embodiments, a surround view is generated from a set of images. These images can be captured by a user intending to produce a surround view or retrieved from storage, depending on the application. Because a surround view is not limited or restricted with respect to a certain amount of visibility, it can provide significantly more visual information about different views of an object or scene. More specifically, although a single viewpoint may be ambiguous to adequately describe a three-dimensional object, multiple views of the object can provide more specific and detailed information. These multiple views can provide enough information to allow a visual search query to yield more accurate search results. Because a surround view provides views from many sides of an object, distinctive views that are appropriate for search can be selected from the surround view or requested from a user if a distinctive view is not available. For instance, if the data captured or otherwise provided is not sufficient to allow recognition or generation of the object or scene of interest with a sufficiently high certainty, a capturing system can guide a user to continue moving the capturing device or provide additional image data. In particular embodiments, if a surround view is determined to need additional views to produce a more accurate model, a user may be prompted to provide additional images.

Once a surround view is generated, it can be used in various applications, in particular embodiments. One application for a surround view includes allowing a user to navigate a surround view or otherwise interact with it. According to various embodiments, a surround view is designed to simulate the feeling of being physically present in a scene as the user interacts with the surround view. This experience depends not only on the viewing angle of the camera, but on the type of surround view that is being viewed. Although a surround view does not need to have a specific fixed geometry overall, different types of geometries can be represented over a local segment of a surround view such as a concave, convex, and flat surround view, in particular embodiments.

In particular example embodiments, the mode of navigation is informed by the type of geometry represented in a surround view. For instance, with concave surround views, the act of rotating a device (such as a smartphone, etc.) can mimic that of rotating a stationary observer who is looking out at a surrounding scene. In some applications, swiping the screen in one direction can cause the view to rotate in the opposite direction. This effect is akin to having a user stand inside a hollow cylinder and pushing its walls to rotate around the user. In other examples with convex surround views, rotating the device can cause the view to orbit in the direction it is leaning into, such that the object of interest remains centered. In some applications, swiping the screen in one direction causes the viewing angle to rotate in the same direction: this creates the sensation of rotating the object of interest about its axis or having the user rotate around the object. In some examples with flat views, rotating or moving a device can cause the view to translate in the direction of the device's movement. In addition, swiping the screen in one direction can cause the view to translate in the opposite direction, as if pushing foreground objects to the side.

In some examples, a user may be able to navigate a multi-surround view or a graph of surround views in which individual surround views can be loaded piece by piece and further surround views may be loaded when necessary (e.g. when they are adjacent to/overlap the current surround view and/or the user navigates towards them). If the user reaches a point in a surround view where two or more surround views overlap, the user can select which of those overlapping surround views to follow. In some instances, the selection of which surround view to follow can be based on the direction the user swipes or moves the device.

Figure 9:
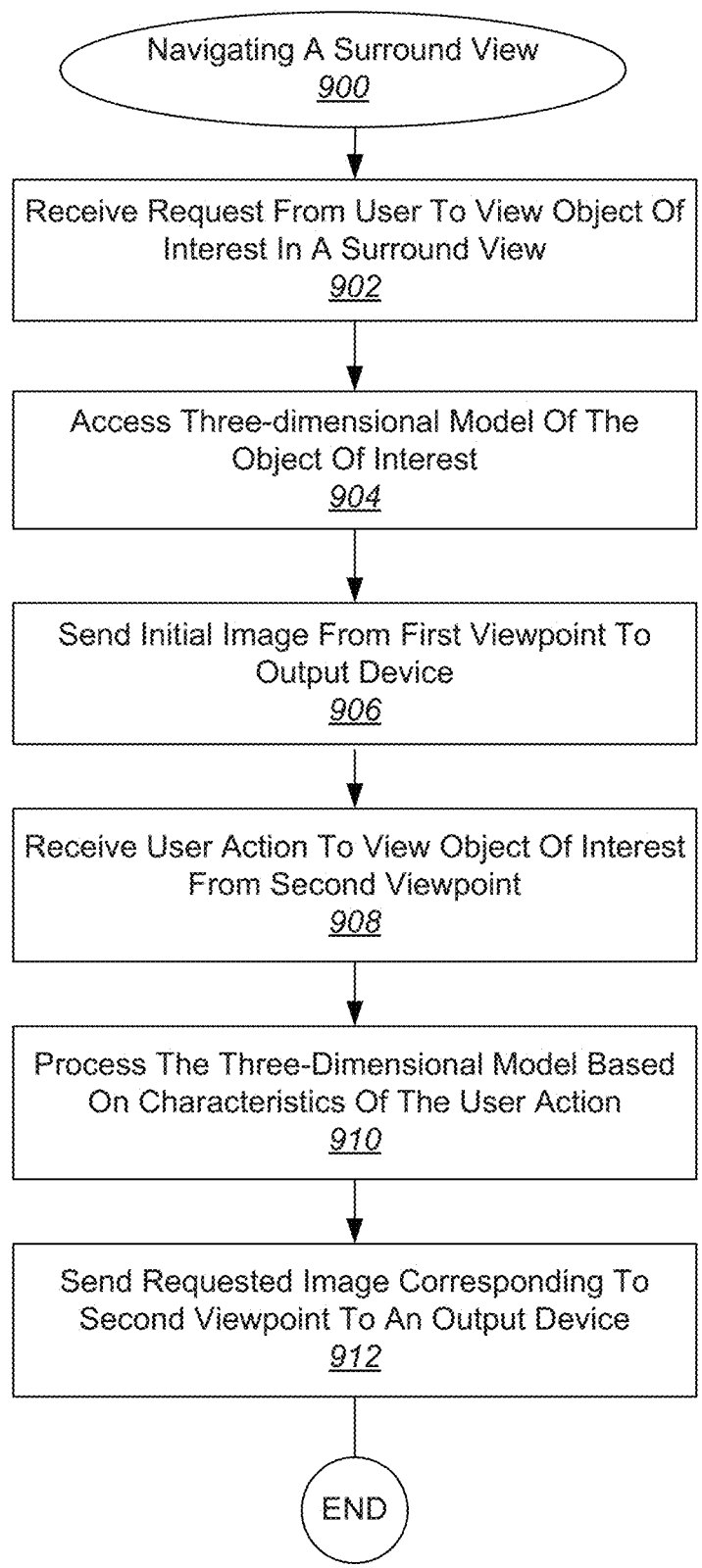
FIG. 9 illustrates one example of a process for navigating a surround view.

With reference to FIG. 9, shown is one example of a process for navigating a surround view 900. In the present example, a request is received from a user to view an object of interest in a surround view at 902. According to various embodiments, the request can also be a generic request to view a surround view without a particular object of interest, such as when viewing a landscape or panoramic view. Next, a three-dimensional model of the object is accessed at 904. This three-dimensional model can include all or a portion of a stored surround view. For instance, the three-dimensional model can be a segmented content view in some applications. An initial image is then sent from a first viewpoint to an output device at 906. This first viewpoint serves as a starting point for viewing the surround view on the output device.

In the present embodiment, a user action is then received to view the object of interest from a second viewpoint at 908. This user action can include moving (e.g. tilting, translating, rotating, etc.) an input device, swiping the screen, etc., depending on the application. For instance, the user action can correspond to motion associated with a locally concave surround view, a locally convex surround view, or a locally flat surround view, etc. Based on the characteristics of the user action, the three-dimensional model is processed at 910. For instance, movement of the input device can be detected and a corresponding viewpoint of the object of interest can be found. Depending on the application, the input device and output device can both be included in a mobile device, etc. In some examples, the requested image corresponds to an image captured prior to generation of the surround view. In other examples the requested image is generated based on the three-dimensional model (e.g. by interpolation, etc.). An image from this viewpoint can be sent to the output device at 912. In some embodiments, the selected image can be provided to the output device along with a degree of certainty as to the accuracy of the selected image. For instance, when interpolation algorithms are used to generate an image from a particular viewpoint, the degree of certainty can vary and may be provided to a user in some applications. In other examples, a message can be provided to the output device indicating if there is insufficient information in the surround view to provide the requested images.

In some embodiments, intermediate images can be sent between the initial image at 906 and the requested image at 912. In particular, these intermediate images can correspond to viewpoints located between a first viewpoint associated with the initial image and a second viewpoint associated with the requested image. Furthermore, these intermediate images can be selected based on the characteristics of the user action. For instance, the intermediate images can follow the path of movement of the input device associated with the user action, such that the intermediate images provide a visual navigation of the object of interest.

Figure 10:
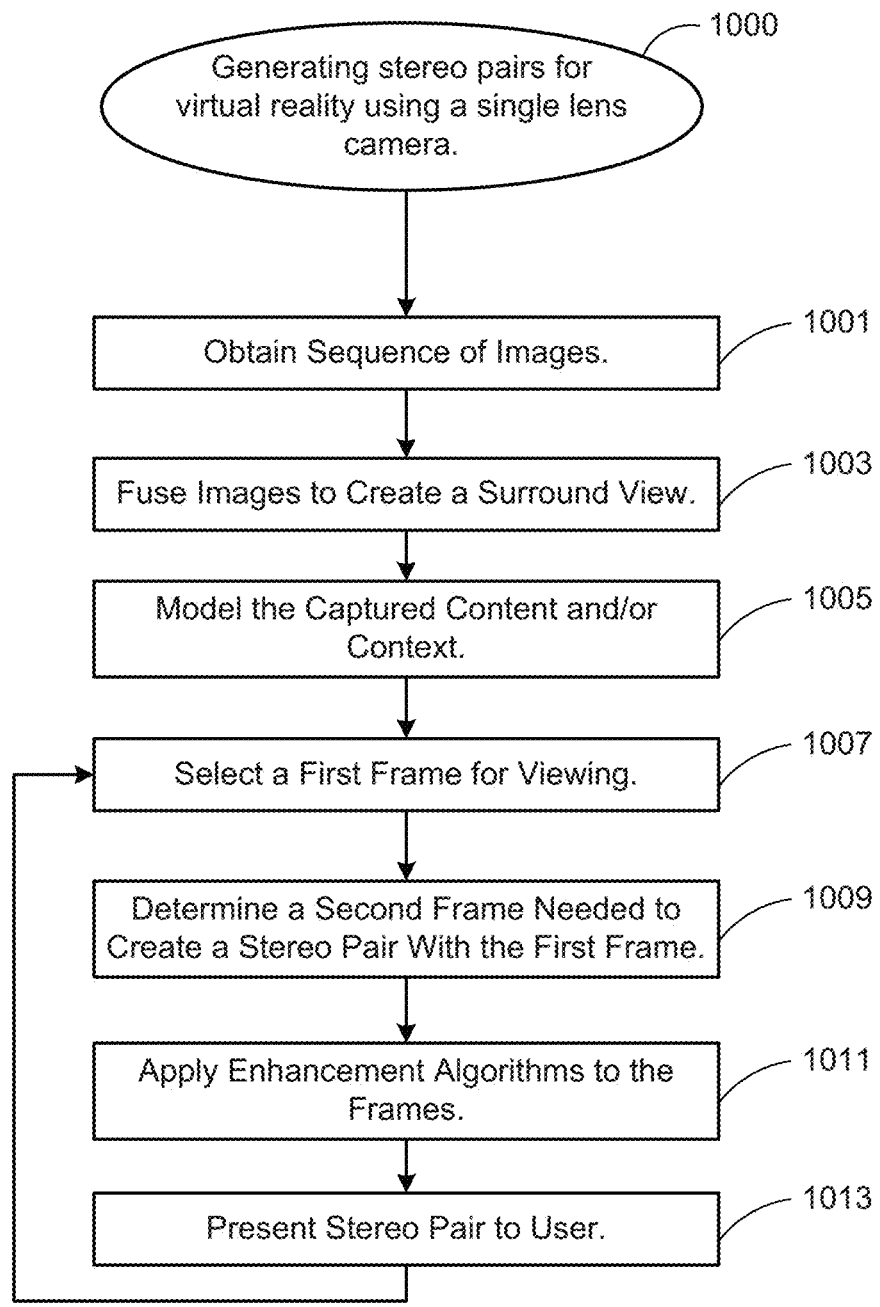
FIG. 10 illustrates an example method for generating stereo pairs for virtual reality, in accordance with one or more embodiments.

Stereo pairs may be generated from the images, captured as described above, and presented to the user to provide a sense of depth to the surround view generated. With reference to FIG. 10, shown is an example method 1000 for generating stereo pairs for virtual reality using a single lens camera, in accordance with one or more embodiments. At step 1001, a sequence of images is obtained. In some embodiments, the sequence of images may be multiple snapshots and/or video captured by a camera as previously described with reference to FIGS. 1-7. In some embodiments, the camera may comprise a single lens for capturing sequential images one at a time. In some embodiments, the captured image may include 2D images, such as 2D images 104. In some embodiments, other data may also be obtained from the camera and/or user, including location information, such as location information 106, as well as depth information.

At step 1003, the sequence of images is fused to create a surround view. For example, the images and other data captured in step 1001 may be fused together at a sensor fusion block, such as sensor fusion block 110 as previously described with reference to FIG. 1. At step 1005, the captured content and/or context is modeled. As previously described, the data that has been fused together in step 1003 may then be used for content modeling and/or context modeling, as discussed with reference to content modeling 112 and context modeling 114, respectively, in FIG. 1. As such, a three-dimensional surround view of an object and/or the context may be provided and accessed by a user. As previously described with reference to block 116 in FIG. 1, various enhancement algorithms may be employed to enhance the user experience. For instance, automatic frame selection, stabilization, view interpolation, image rotation, infinite smoothing, filters, and/or compression can be used during capture of surround view data. In some examples, these enhancement algorithms can be applied to image data after acquisition of the data. In other examples, these enhancement algorithms can be applied to image data during capture of surround view data. In some embodiments, the enhancement algorithms may be applied during a subsequent step, such as at step 1011, described below.

At step 1007, a first frame is selected for viewing. In some embodiments, a first frame may be selected by receiving a request from a user to view an object of interest in a surround view, such as in step 902, described above. As previously described, the request may also be a generic request to view a surround view without a particular object of interest. In some embodiments, a particular first frame may be specifically selected by the user. In some embodiments, the first frame may be designated for viewing by either the right eye or the left eye. In the present example, the first frame selected at step 1007 is designated for viewing by the left eye.

At step 1009, a second frame needed to create a stereo pair with the first frame is determined. The second frame may be designated for viewing by the other eye, not designated to the first frame. Thus, in the present example, the second frame determined at step 1008 is designated for viewing by the right eye. In various embodiments, the second frame may be selected based on a desired angle of vergence at the object of interest and/or focal point. Vergence refers to the simultaneous movement of both eyes in opposite directions to obtain or maintain single binocular vision. When a creature with binocular vision looks at an object, the eyes must rotate around a vertical axis so that the projection of the image is in the center of the retina in both eyes. To look at an object closer by, the eyes rotate towards each other (convergence), while for an object farther away they rotate away from each other (divergence). Exaggerated convergence is called cross eyed viewing (focusing on the nose for example). When looking into the distance, the eyes diverge until parallel, effectively fixating the same point at infinity (or very far away). As used herein, the angle of vergence refers to the angle between the lines of sight of each frame to the object of interest and/or desired focal point. In some embodiments, a degree of vergence may be between 5 degrees to 10 degrees. In some embodiments, a desired degree of vergence of more than 10 degrees may cause a user to see different objects and/or experience disjointed views (i.e., double vision or diplopia).

In some embodiments, the second frame may additionally be selected based on gathered location and/or IMU information. For example, if the object of interest and/or focal point is closer, a larger degree of vergence may be desired to convey an appropriate level of depth. Conversely, if the object of interest and/or focal point is further away, a smaller degree of vergence may be desired.

In some embodiments, the degree of vergence may then be used to determine a spatial baseline. The spatial baseline refers to the distance between the left eye and the right eye, and consequently, the distance between the first frame and the second frame. The average distance between the left eye and right eye of a human is about 10 cm to 15 cm. However, in some embodiments, a wider spatial baseline may be allowed in order to enhance the experience effect of depth. For example, a desired spatial baseline may be 30 cm.

Once the distance of the spatial baseline has been determined, a second frame located at that distance away from the first frame may be selected to be used as the stereo pair of the first frame. In some embodiments, the second frame located at the determined distance may be an actual frame captured by the camera at step 1001. In some embodiments, the second frame located at the determined distance may be an artificial frame generated by interpolation, or other enhancement algorithms, in creating the surround view. In other embodiments, an artificial second frame may be generated by various enhancement algorithms described below with reference to step 1009.

At step 1011, enhancement algorithms are applied to the frames. In some embodiments, enhancement algorithms may only be applied to the second frame. In some embodiments, step 1011 may alternatively, or additionally, occur after step 1005 and before selecting the first frame for viewing at step 1007. In various embodiments, such algorithms may include: automatic frame selection, stabilization, view interpolation, filters, and/or compression. In some embodiments, the enhancement algorithms may include image rotation. In order for the user to perceive depth, the view of each frame must be angled toward the object of interest such that the line of sight to the object of interest is perpendicular to the image frame. In some embodiments, certain portions of the image of a frame may be rotated more or less than other portions of that image. For example, portions identified as context and/or background with a focal point at infinity may be rotated less than a nearby object of interest in the foreground identified as the content.

In some embodiments, image rotation may include using IMU and image data to identify regions that belong to the foreground and regions that belong to the background. For example, rotation information from the IMU data informs how a keypoint at infinity should move. This then can be used to identify foreground regions where a keypoint's movement violates the optical flow for infinity. In some embodiments, the foreground may correspond to the content or an object of interest, and the background may correspond to the context, as described with reference to FIG. 4. In some embodiments, the keypoints may be used to determine optimal transformation for one or more images in a stereo pair. In some embodiments, the keypoints are used to determine focal length and rotation parameters for the optimal transformation.

A Harris corner detector algorithm may be implemented to detect salient features to designate as keypoints in each frame, such as areas of large contrast, areas with minimum ambiguity in different dimensions, and/or areas with high cornerness. In some embodiments, only keypoints corresponding to the object of interest and/or content are designated. For example, when performing image rotation for a concave surround view, only keypoints corresponding to the object of interest and/or content will be designated and used. However, where image rotation is used for a convex surround view, keypoints corresponding to both the background and the foreground may be designated and used. Then, a Kanade-Lucas-Tomasi (KLT) feature tracker may be used to track keypoints between two image frames. In some embodiments, one or more keypoints tracked by the KLT feature tracker for image rotation may be the same keypoints used by other enhancement algorithms, such as infinite smoothing and/or view interpolation, as further described herein.

Two keypoints in a first frame and corresponding keypoints in a second frame may be selected at random to determine the rotation transformation. Based on the two keypoint correspondences, the focal length and rotation are solved to calculate the transformation. In various embodiments, only keypoints corresponding to the foreground regions are used to solve for focal length and rotation. In some embodiments, finding the optimal rotation transformation may further include minimizing the image intensity difference between the foreground regions of the two image frames. This two-dimensional 3×3 image transformation can be mapped from the combination of an actual 3D camera rotation and the focal length. The new pre-rotated image sequence is then produced given the solved transformation. An example of optimizing the two-dimensional image transformation is further described with reference to FIG. 21.

At step 1013, the stereo pair is presented to the user. In some embodiments, a first frame in the stereo pair is designated to be viewed by the user's left eye, while the second frame is designated to be viewed by the user's right eye. In some embodiments, the first and second frames are presented to the respective eye each frame is designated for, such that only the left eye views the first frame while only the right eye views the second frame. For example, the frames may be presented to the user in a viewing device, such as a virtual reality headset. This effectively applies a 3×3 image warp to the left eye and right eye images. By viewing each frame in the stereo pair with separate eyes in this way, these two-dimensional images are combined in the user's brain to give the perception of 3D depth.

The method may then return to step 1007 to select another frame for viewing. As previously described above, a subsequent frame may be selected by the user. In other embodiments, a subsequent frame may be selected based on a received user action to view the object of interest from a second viewpoint, as described with reference to step 908 in FIG. 9. For example, this user action can include moving (e.g. tilting, translating, rotating, etc.) an input device, swiping the screen, etc., depending on the application. For instance, the user action can correspond to motion associated with a locally concave surround view, a locally convex surround view, or a locally flat surround view, etc. Additionally, the user action may include movement of the user and/or a viewing device in three-dimensional space. For example, if the user moves the viewing device to another location in three-dimensional space, an appropriate frame corresponding to the view of the object of interest, content, and/or context from that camera location in three dimensional space. As previously described, intermediate images can be rendered between image frames in a surround view. Such intermediate images correspond to viewpoints located between the viewpoints of the existing image frames. In some embodiments, stereo pairs may be generated for each of these intermediate images and presented to the user by method 1000.

Thus, method 1000 may be used to generate stereoscopic pairs of images for a monocular image sequence captured by a single lens camera. Unlike existing methods in which stereoscopic pairs are created by simultaneously capturing two images at a predetermined distance apart along a camera translation, method 1000, and other processes described herein, can create stereoscopic pairs with only a sequence of single images captured along a camera translation. Thus, fewer images, and corresponding image data is required, resulting in less data storage. Moreover, the information required for selection of stereoscopic pairs and image rotation for method 1000 do not need to be stored and may be determined in real-time. Additionally, parameters are not set for stereoscopic pairs of images, unlike in existing methods. For example, a wider or shorter distance may be selected between each image frame in a stereoscopic pair in order to increase or decrease the depth perception, respectively. Furthermore, one or more various objects within an image sequence may be determined to be an object of interest and different rotation. Images may be rotated differently depending on which object or objects are determined to be the object of interest. Moreover, various portions within an image may be rotated differently based on the determined object of interest. In other words, different rotation transformations may be determined for different portions of an image.

By generating and presenting stereo pairs corresponding to sequence of image frames in a surround view, method 1000 may be used to provide depth to the surround view. In various instances, this allows the user to perceive an object of interest as a three-dimensional model without actually rendering and/or storing an actual three-dimensional model. In other words, there is no polygon generation or texture mapping over a three-dimensional mesh and/or polygon model, as in existing methods. However, the user still perceives the content and/or context as an actual three-dimensional model with depth from multiple viewpoint angles. The three-dimensional effect provided by the surround view is generated simply through stitching of actual two-dimensional images and/or portions thereof, and generation of stereo pairs corresponding to the two-dimensional images.

Figure 11A:
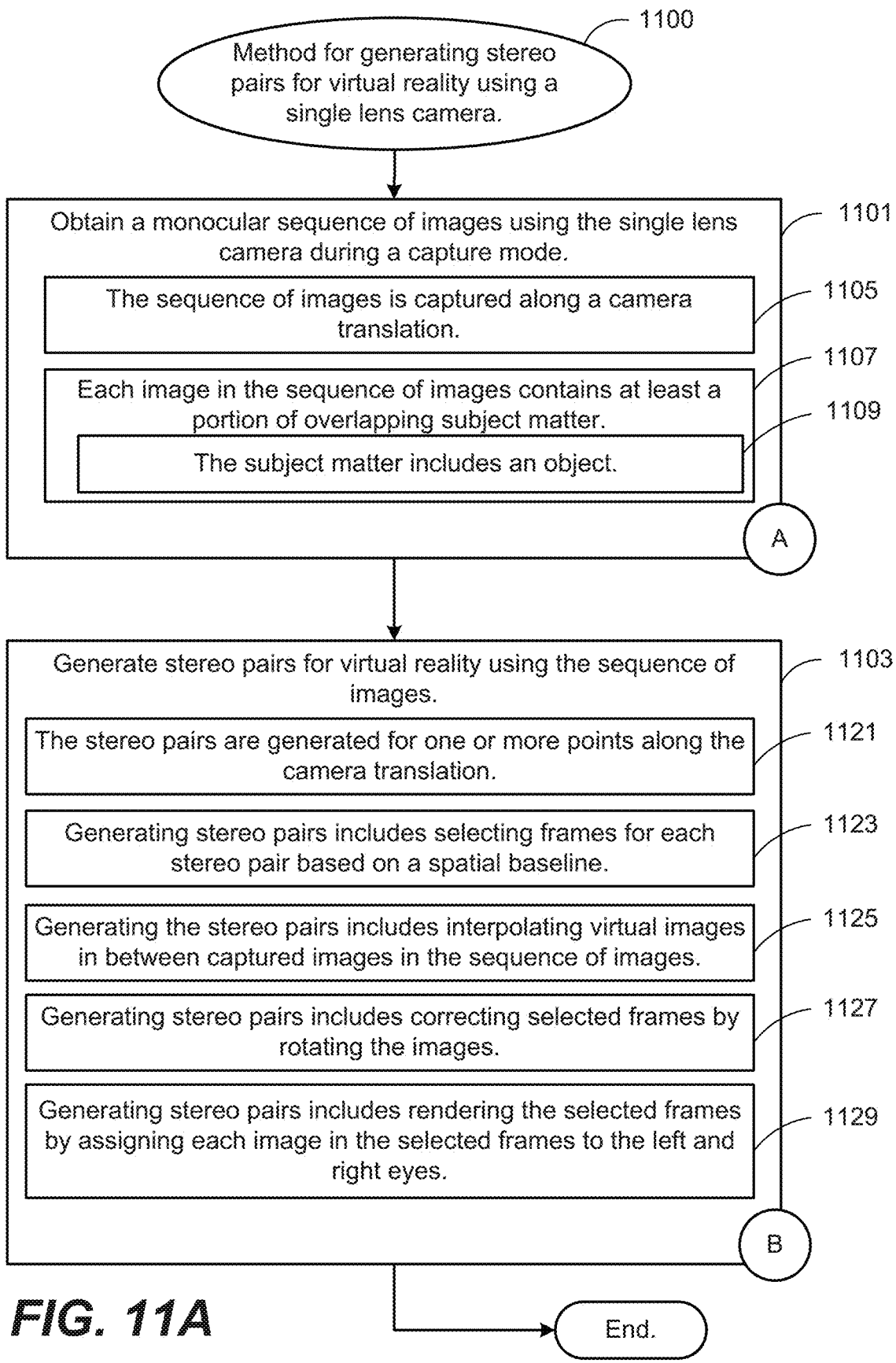
FIGS. 11A and 11B illustrate another example method for generating stereo pairs for virtual reality using a single lens camera, in accordance with one or more embodiments.
Figure 11B:
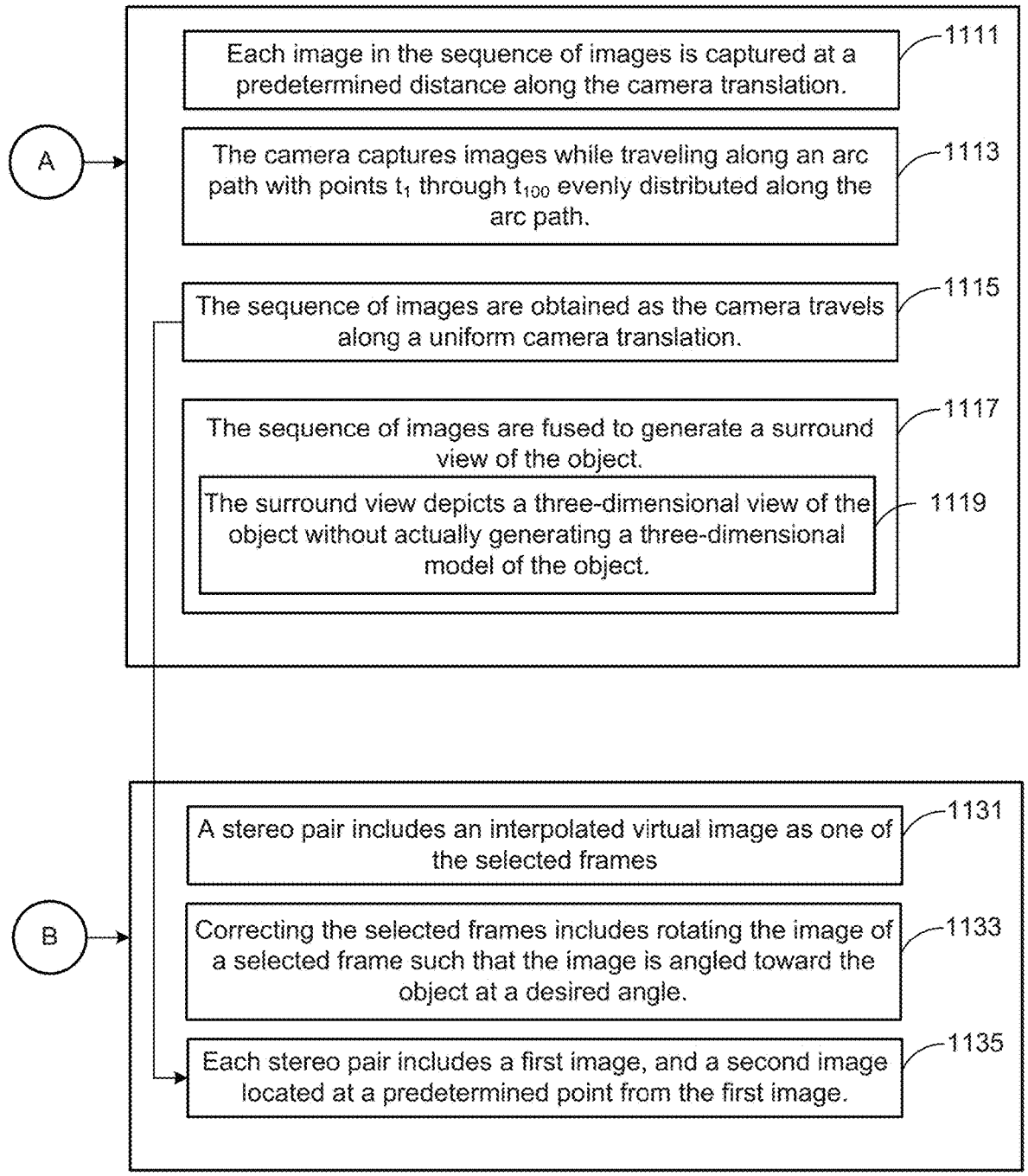

FIGS. 11A and 11B illustrate another example method 1100 for generating stereo pairs for virtual reality using a single lens camera, in accordance with one or more embodiments. At operation 1101, a monocular sequence of images is obtained using the single lens camera during a capture mode, such as in step 1001. In some embodiments, the sequence of images is captured along a camera translation 1105. For example, the camera translation 1105 may be any combination of one or more of the camera motions previously described with reference to FIGS. 3 and 6A-6E. As an example, the camera translation 1105 may be a concave arc movement capturing a concave surround view, such as in FIGS. 3, 6B, and 6D. In some embodiments, each image in the sequence of images contains at least a portion of overlapping subject matter 1107. In some embodiments, the subject matter 1107 includes an object 1109. For example, object 1109 may be an object of interest 308, as described in FIG. 3, or other content, such as content 404. In some embodiments, the subject matter 1107 may additionally, and/or alternatively, include context scenery surrounding objects 310, as described in FIG. 3, or other context, such as context 406.

In some embodiments, each image in the sequence of images is captured at a predetermined distance 1111 along the camera translation 1105. For example, the camera may capture an image at every 60 mm of camera translation along an arc and/or line. In other embodiments, the sequence of images may be captured at predetermined time intervals. For example, images may be captured by the camera at a frame rate of 14 to 26 frames per second. In other embodiments, the camera may capture images at a higher frame rate and the captured images may be stored as a video file.

In some embodiments, the camera captures images while traveling along an arc path 1113 with points $t_1$ through $t_{100}$ even distributed along the arc path 1113. In some embodiments, more or less points $t_0$ may be evenly distributed along the arc path 1113. In other embodiments, points $t_0$ may be unevenly and/or irregularly distributed along the arc path 1113. For example, points $t_0$ may be located at particular positions of interest. In some embodiments, the sequence of images are obtained as the camera travels along a uniform camera translation 1115. A uniform camera translation 1115 may occur where an object of interest is centered in every image and located directly at the center of an arc path 1113 of the camera. However, in various other embodiments, the camera translation relative to the object of interest may not be uniform. The camera translation may be a combination of camera motions, such as when capturing a complex surround view.

In some embodiments, the sequence of images are fused to generate a surround view 1117 of the object 1109, such as in step 1003. In some embodiments, the surround view 1117 depicts a three-dimensional view 1119 of the object 1109 without actually generating a three-dimensional model of the object 1109. In some embodiments, the three-dimensional view 1119 of the object 1109 presents the object 1109 as a three-dimensional model using only the two-dimensional images captured. Thus, there is no requirement to store a rendered three-dimensional model.

At operation 1103, stereo pairs 1121 for virtual reality are generated using the sequence of images. In some embodiments, the stereo pairs 1121 are generated for one or more points along the camera translation 1105. In various embodiments, the stereo pairs may provide additional depth perception to the user when viewing the surround view. In various embodiments, the generation of stereo pairs 1121 may include a number of steps and/or other algorithmic operations.

Generating stereo pairs 1121 may include selecting (1123) frames from each stereo pair 1121 based on a spatial baseline, such as in steps 1007 and 1009. In embodiments where the camera travels along a uniform camera translation 1115, each stereo pair may include a first image, and a second image located at a predetermined point 1135 from the first image. For example, images may be taken by a camera along a uniform camera translation 1115 with points $t_1$ through $t_{100}$ even distributed along the arc path 1113 of the uniform camera translation 1115. Each stereo pair may include a first image located a point $t_n$ and a second image at point and $t_{n+4}$ In some embodiments, one or more images required to create a stereo pair 1121 may not exist as a captured image along the uniform camera translation 1115. Such frames may be generated by interpolating (1125) virtual images 1131 as described below.

Generating stereo pairs 1121 may further include interpolating (1125) virtual images 1131 in between captured images in the sequence of images. In some embodiments, a stereo pair includes an interpolated virtual image 1131 as one of the selected frames. Because frames actually captured by the camera may not exactly correspond to particular points required for a stereoscopic pair, a frame may be artificially rendered. In some embodiments, required frames may be rendered by interpolation, as previously described with reference to FIG. 3, and as further described below with respect to FIGS. 13-20. In some embodiments, a frame may be interpolated for any point $t_n$ distributed along the travel arc and/or line of the camera.

Generating stereo pairs 1121 may further include correcting (1127) selected frames by rotating the images. Each frame in the stereoscopic pair must be correctly angled in order for a user to perceive depth when presented with the stereoscopic pair, and without distortions. In some embodiments, correcting (1127) the selected frames includes rotating the image of a selected frame such that the image is angled toward the object 1109 at a desired angle 1133. For example, the image frame must be rotated so that the line of sight to a desired object of interest and/or other focal point must be perpendicular to the plane of the frame of the image. Such image rotation may be implemented as an enhancement algorithm, such as previously described in step 1011 in FIG. 10. As further described with respect to FIG. 21, the optimal rotation transformation may be based on focal length and rotation parameters determined from keypoints corresponding to the foreground and/or object of interest. The image plane for each frame may also be rotated based on the known camera location and IMU data. The determined optimal transformation may then be applied to one or more of the image frames in the stereo pair such that both frames are perpendicular to a line of sight to the object of interest and/or other focal point. In some embodiments, nearby objects may be rotated more, while distant objects may require less rotation. In some embodiments, interpolation may also be implemented to render the frames with rotated image planes.

In various embodiments, correcting (1127) the selected frames may occur after interpolating (1125) virtual images 1131 between captured images. However, in some embodiments, correcting (1127) the selected frames by image rotation may occur before selecting (1123) frames for each stereo pair, and/or interpolating (1125) virtual images 1131. For example, methods of image rotation as described with reference to step 1011 and FIG. 21 may be applied to all image frames in the sequence of images captured at operation 1101. In some embodiments, such image rotation may utilize focal length and camera rotation as parameters to stabilize the image frames in the sequence, such that all image frames are perpendicular to a line of sight to an object of interest. In such embodiments, virtual images 1131 that are interpolated (1125) from the stabilized frames may not require additional rotation because the interpolation may utilize keypoints and/or control points in image frames that have already been rotated.

Generating stereo pairs 1121 may further include rendering (1129) the selected frames by assigning each image in the selected frames to the left and right eyes, such as in step 1013. As previously described, a first frame in the stereo pair 1121 may be designated for viewing by the left eye of a user, while a second frame in the stereo pair 1121 may be designated for viewing by the right eye of a user. The first and second frames of the stereo pair 1121 may be presented to the designated eyes of a user wearing a virtual reality headset and/or other device. By viewing each frame in the stereo pair with separate eyes in this way, these two-dimensional images are combined in the user's brain to give the perception of 3D depth.

Figure 12:
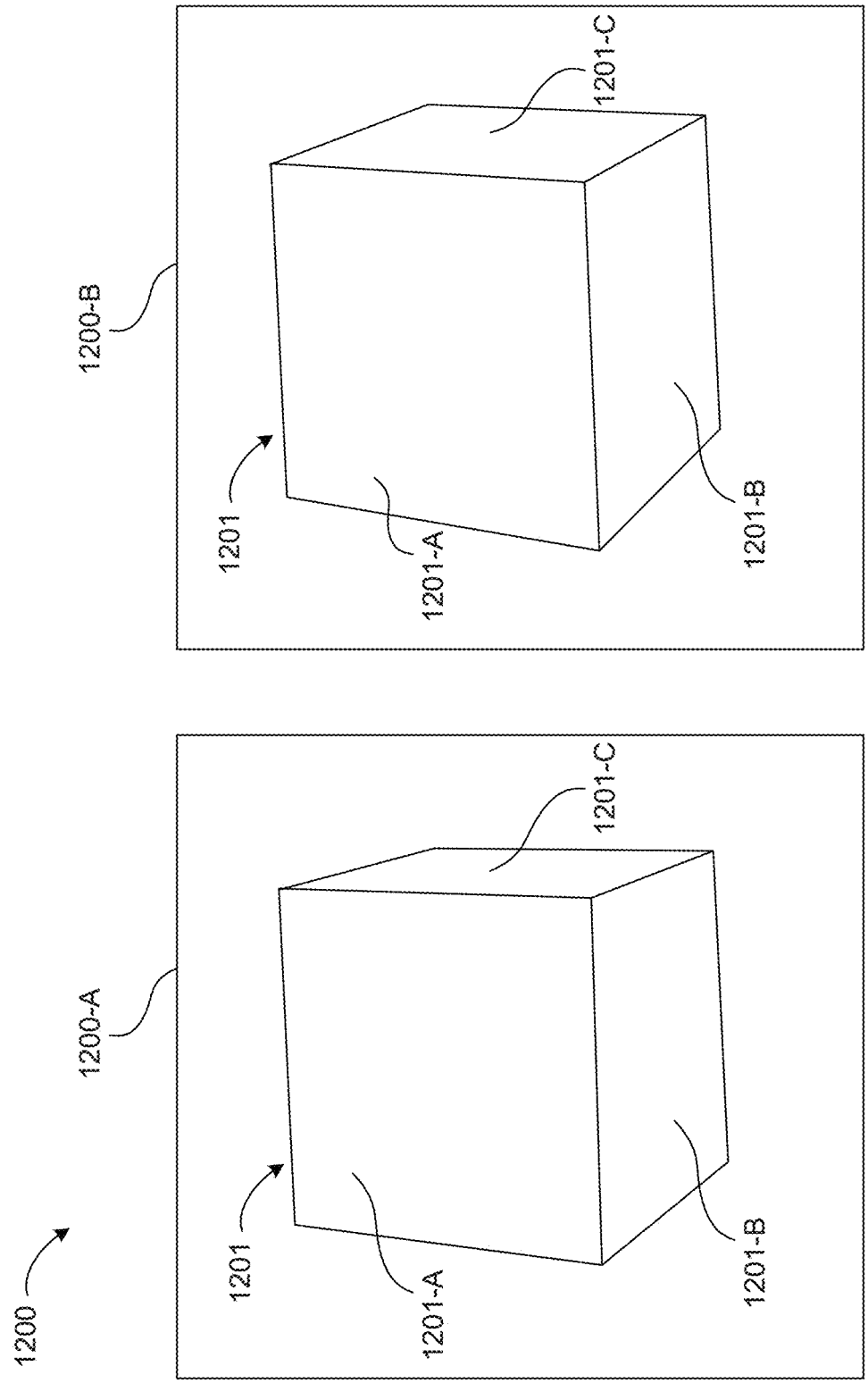
FIG. 12 illustrates an example of a stereo pair for virtual reality, in accordance with one or more embodiments.

With reference to FIG. 12, an example of a stereo pair 1200 for virtual reality is illustrated, in accordance with one or more embodiments. Stereo pair 1200 includes a first frame 1200-A and a second frame 1200-B, which include an image of a cube 1201. Frames 1200-A and 1200-B correspond to images captures along a camera translation 1210. Frames 1200-A and 1200-B may include overlapping subject matter, as shown by shaded portion 1212. The arc path of camera translation 1210 may or may not be uniform around cube 1201. Frame 1200-A is a frame that may be designated for viewing by a user's left eye. Accordingly, frame 1200-A may be displayed on a screen in a virtual reality headset corresponding to the left eye view. Frame 1200-B is a frame that may be designated for viewing by a user's right eye. Accordingly, frame 1200-B may be displayed on a screen in a virtual reality headset corresponding to the right eye view.

As can be seen, cube 1201 includes sides 1201-A, 1201-B, and 1201-C that are visible within the images of frames 1200-A and 1200-B. According to various embodiments, frames 1200-A and 1200-B may include slightly different views of cube 1201 corresponding to their respective positions on a spatial baseline. As previously described, frame 1200-A may be selected, as in step 1007 or operation 1103, based on receiving a request from a user to view an object of interest in a surround view. Frame 1200-A may be selected as a starting position for viewing cube 1201. In other embodiments, frame 1200-A may be selected based on user input selecting a starting position for viewing cube 1201. Frame 1200-A is then designated for left eye viewing. In some embodiments, frame 1200-A may be artificially rendered by view interpolation using existing images captured. The image of frame 1200-A may include a line of sight 1206-A to a focal point 1205 that is perpendicular to the plane of frame 1200-A. In some embodiments, image rotation may be implemented to correct (1127) the image of frame 1200-A such that the line of sight 1206-A to focal point 1205 is perpendicular to the plane of frame 1200-A.

The second frame 1200-B is then determined, as in step 1009. As previously described, frame 1200-B may be selected based on a desired angle of vergence 1207 between the line of sight 1206-A for frame 1200-A and the line of sight 1206-B to focal point 1205 for frame 1200-B. Frame 1200-B may additionally, and/or alternatively, be selected based on a determined spatial baseline. In some embodiments, the determination of frame 1200-B may utilize IMU and other location information gathered. In some embodiments, frame 1200-B may be artificially rendered by view interpolation using existing images captured. In some embodiments, image rotation may be implemented to correct (1127) the image of frame 1200-B such that the line of sight 1206-B to focal point 1205 is perpendicular to the plane of frame 1200-B. As depicted in FIG. 12, the images within each frame contain slightly offset views of cube 1201. For example, a greater area of side 1201-C is visible in frame 1200-B as compared to within frame 1200-A.

In other embodiments, the first frame selected may be frame 1200-B and frame 1200-A may be determined to be included within stereo pair 1200 based on the angle of vergence, IMU data, and/or other location information, as previously described.

As described above, view interpolation can be used to improve the viewing experience. In particular, to avoid sudden "jumps" between stabilized frames, synthetic, intermediate views can be rendered during acquisition or generation of a surround view. Additionally, synthetic, intermediate views may also be rendered to complete stereoscopic pairs of frames. According to various embodiments, only a limited amount of image frames are stored for each surround view for storage efficiency. In some examples, the selection of these frames is based on the motion of the camera rather than on time. For instance, a new frame is sampled only if the camera moved sufficiently with respect to the previously sampled frame. Consequently, in order to provide a smooth viewing experience for a user interacting with a surround view, artificially rendered frames must be generated. These artificially rendered frames serve to close the gap between two sampled frames that would otherwise appear to have a "jump" between them.

Figure 21:
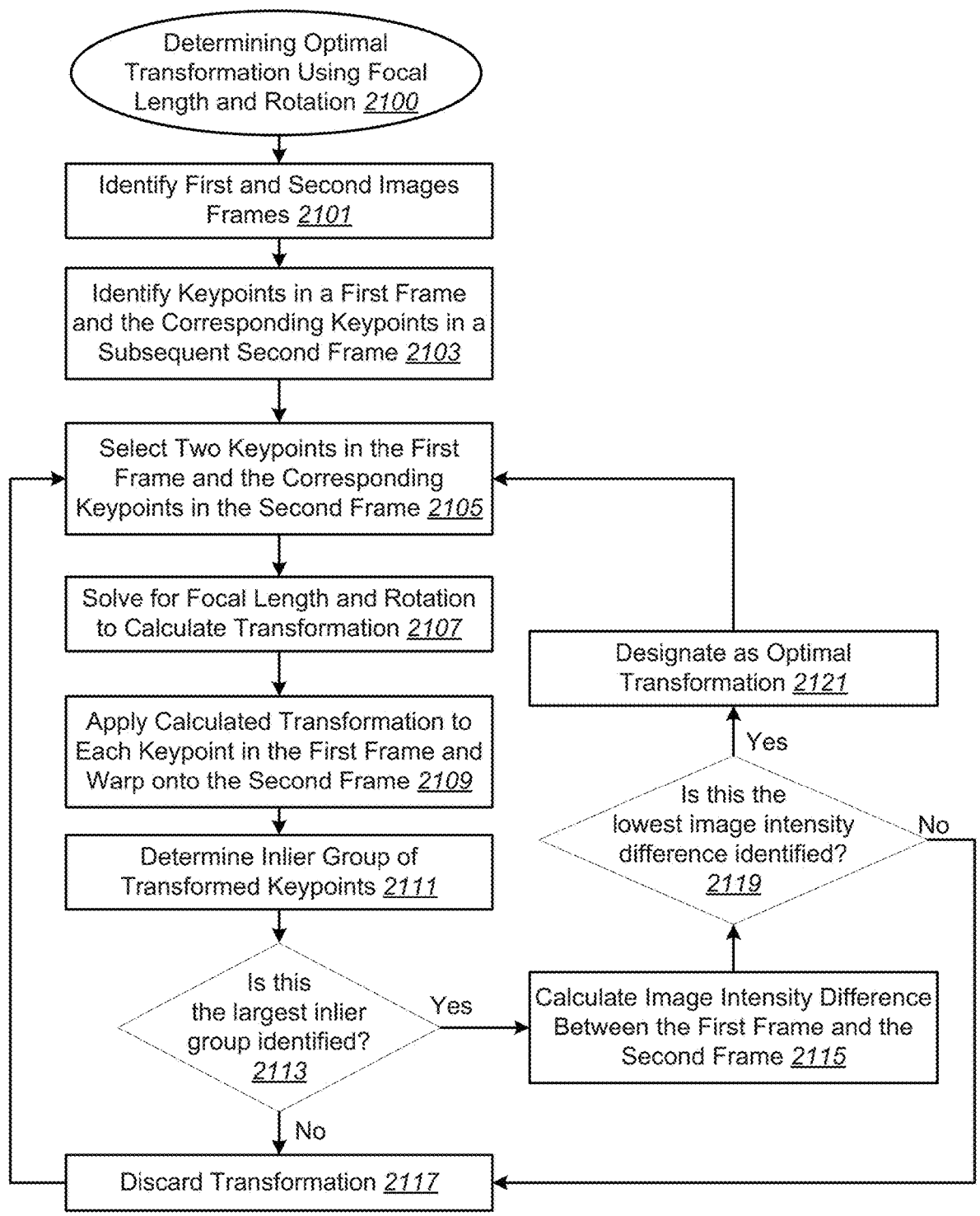
FIG. 21 illustrates an example method for determining the optimal transformation using focal length and rotation as parameters, in accordance with one or more embodiments.

Another result is that a frame that is located at a particular point along the camera translation, which needed to create a stereo pair, may not exist. An artificially frame may be rendered to serve as the frame required to complete the stereo pair. Accordingly, by generating these artificially rendered frames, smooth navigation within the surround view becomes possible. In some embodiments, frames that have been rotated based on methods described with respect to step 1011 and FIG. 21 are already stabilized and correctly focused onto the object of interest. Thus, image frames interpolated based on these rotated frames may not require additional image rotation applied.

Various embodiments described below include methods of viewpoint interpolation and extrapolation that can be used to generate artificially rendered frames. In various examples, interpolation between frames is performed along a path between the frames. In some instances, this path can follow a non-linear trajectory. In addition, various described extrapolation methods allow the artificially rendered frame to represent a view from a location that is not on the trajectory of the recording camera or in between two sampled frames. By providing interpolation and extrapolation methods for paths between or beyond the originally provided frames, various artificially rendered views can be provided for a surround view.

Various embodiments of the present disclosure relate generally to systems and processes for artificially rendering images using interpolation of tracked control points. According to particular embodiments, a set of control points is tracked between a first frame and a second frame, where the first frame includes a first image captured from a first location and the second frame includes a second image captured from a second location. An artificially rendered image corresponding to a third location is then generated by interpolating individual control points for the third location using the set of control points and interpolating pixel locations using the individual control points. The individual control points are used to transform image data.

Figure 13:
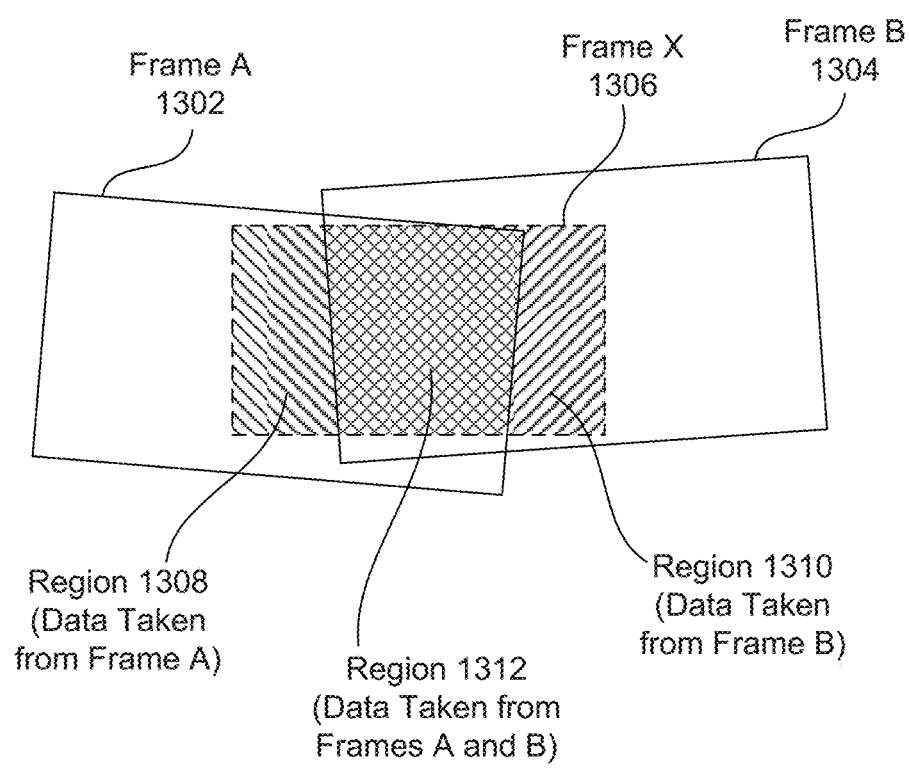
FIG. 13 illustrates an example of combining image information gathered from two frames to artificially render an image for another frame using weighted image information.

In the present example, combining the image information gathered from both Frames A and B, as described in FIG. 3, can be done in various ways. With reference to FIG. 13, shown is one example of a way to combine image information gathered from both Frames A and B to artificially render an image in Frame X using weighted image information. As shown, image information is taken from Frame A 1302 and Frame B 1304 to generate an image in Frame X 1306. Image information in Region 1308 of Frame X 1306 is taken from Frame A 1302. Image information in Region 1310 of Frame X 1306 is taken from Frame B 1304. Image information in Region 1312 of Frame X 1306 includes information from both Frame A 1302 and Frame B 1304. In order to account for the overlap in information, the image information is weighted. Specifically, the information is combined using the image information from Frame A 1302 using 1-x and the image information from Frame B 1304 using x.

Figure 14:
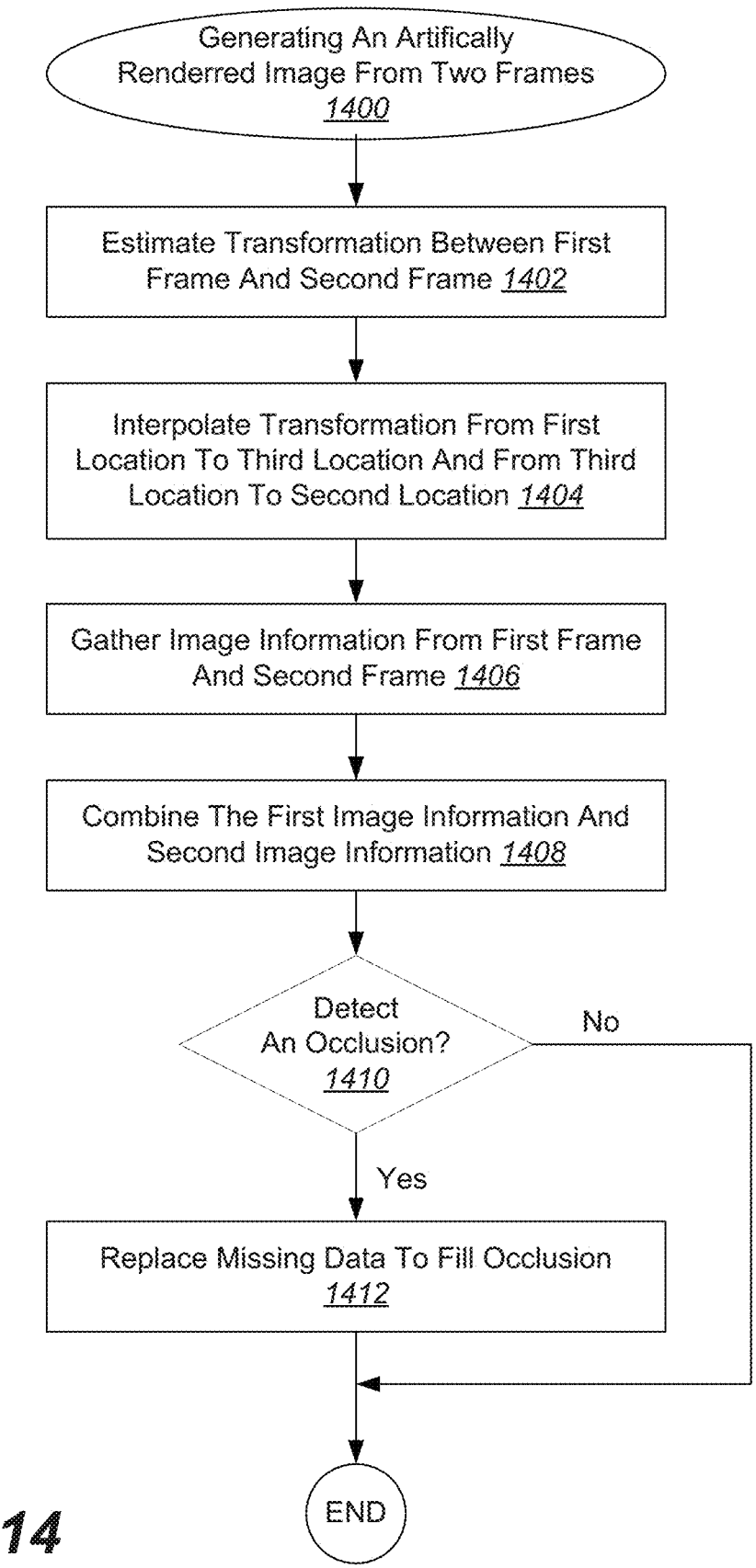
FIG. 14 illustrates an example of a process for generating an artificially rendered image from two frames.

With reference to FIG. 14, shown is an example of a process 1400 for generating an artificially rendered image from two frames. In this example, a transformation is estimated between a first frame and a second frame at 1402. The transformation is estimated using methods such as homography, affine, similarity, translation, rotation, or scale. As described above with regard to FIG. 3, the first frame includes a first image captured from a first location (Location A 322) and the second frame includes a second image captured from a second location (Location B 324). In some examples, the first image and second image are associated with the same layer. Next, an artificially rendered image is rendered corresponding to a third location. This third location is positioned on a trajectory between the first location and the second location, as shown as Location X 326 in FIG. 3.

The artificially rendered image is generated in a number of steps. First, a transformation is interpolated from the first location to the third location and from the third location to the second location at 1404. In some instances, interpolating the transformation includes parameterizing the transformation from the first location to the third location and from the third location to the second location. Furthermore, in some examples, the parameterized transformation is then linearly interpolated.

Next, image information is gathered from the first frame and the second frame at 1406 by transferring first image information from the first frame to the third frame based on the interpolated transformation and second image information from the second frame to the third frame based on the interpolated transformation. Finally, the first image information and the second image information is combined to yield the artificially rendered image. In some examples, combining the first image information and the second image information includes weighting the first image information from the first frame and the second image information from the second frame.

According to various embodiments, the process can end with combining the first image information and second image information at 1408. However, according to the present example, the process shown continues with determining whether an occlusion is present in the artificially rendered image at 1410. Such an occlusion is created by a change in layer placement between the first frame and second frame. Specifically, the first image and second image may include foregrounds and backgrounds that include one or more layers, each layer corresponding to a region of image pixels that share a similar motion, as described in more detail below with regard to FIG. 15. These layers can move relative to each other. In some cases, the layers may move in a manner causing an occlusion in a combined image. If an occlusion is detected, then the missing data is replaced to fill the first occlusion at 1412. In some instances, the missing data is obtained by interpolation or extrapolation. In other instances, the missing data is obtained from the first frame or the second frame. In yet other instances, the missing data is obtained from another frame (separate from the first and second frame) that includes image information corresponding to the missing data. In another example, the missing data is obtained by extrapolating from surrounding image data. This surrounding image data includes information from frames located near the first location and second location.

With reference to FIG. 15, shown is an example of combining image information gathered from both Frames A and B to artificially render an image in Frame X by using multiple layers of an image. The present example uses the method described above with regard to FIG. 14, where the first frame and second frame are made up of two or more layers. In particular, the first frame, which includes a view at Time A 1502, includes a background layer 1506 and foreground layer 1504. The second frame, which includes a view at Time B 1508, includes a background layer 1512 and foreground layer 1510. In some examples, foreground and/or background can include one or more layer. In the present example, a layer is a region of image pixels that share a similar motion, based on factors such as depth and or speed of the corresponding real world object.

In the present example, viewpoint-interpolation can be used to generate an artificially rendered image as described above with regard to FIG. 14. In addition, because different motions of the layers can create occlusions and/or regions with missing data, the process can also include methods for filling the regions corresponding to any detected occlusions. Whether data is occluded or missing is based on the ordering of layers. Although the layers are expected to stay in the same order, they can switch order if the objects change their depth location within the scene. For instance, occlusions are created if a first layer moves in front of a second layer, where the first layer is closer to the camera than second layer. In the case that the first layer is non-see-through, image information from the first layer is taken wherever the first and second layer overlap. In the case that the first layer is partially see-through, image information is taken from both layers according to the opacity of the first layer. This process can also be extended to more than two layers.

As described above with regard to FIG. 14, missing information can be obtained in various ways, including interpolation or extrapolation. For instance, missing data can be taken from only one of the frames, depending on which frame includes a view of the missing data. In another example, the missing data can be taken from other frames where this region is visible. For instance, in a surround view that includes various frames and viewpoints, other frames can be used to fill in this missing data. In another example, the missing data can be extrapolated from surrounding image data, to create artificial image data that estimates what the missing data would look like. In yet another example, viewpoint-extrapolation using multiple layers can be applied outside of the trajectory between the two frames, by moving the different layers in perpendicular motion to the trajectory motion, as shown in more detail with regard to FIG. 17. According to various examples, the transform between the two frames can be an image transformation or a 3D transformation. An image transformation can use methods such as homography, affine, similarity, translation, rotation, scale. For a 3D transformation, layers are moved with respect to their depth and the 3D transformation, according to various embodiments.

Figure 16A:
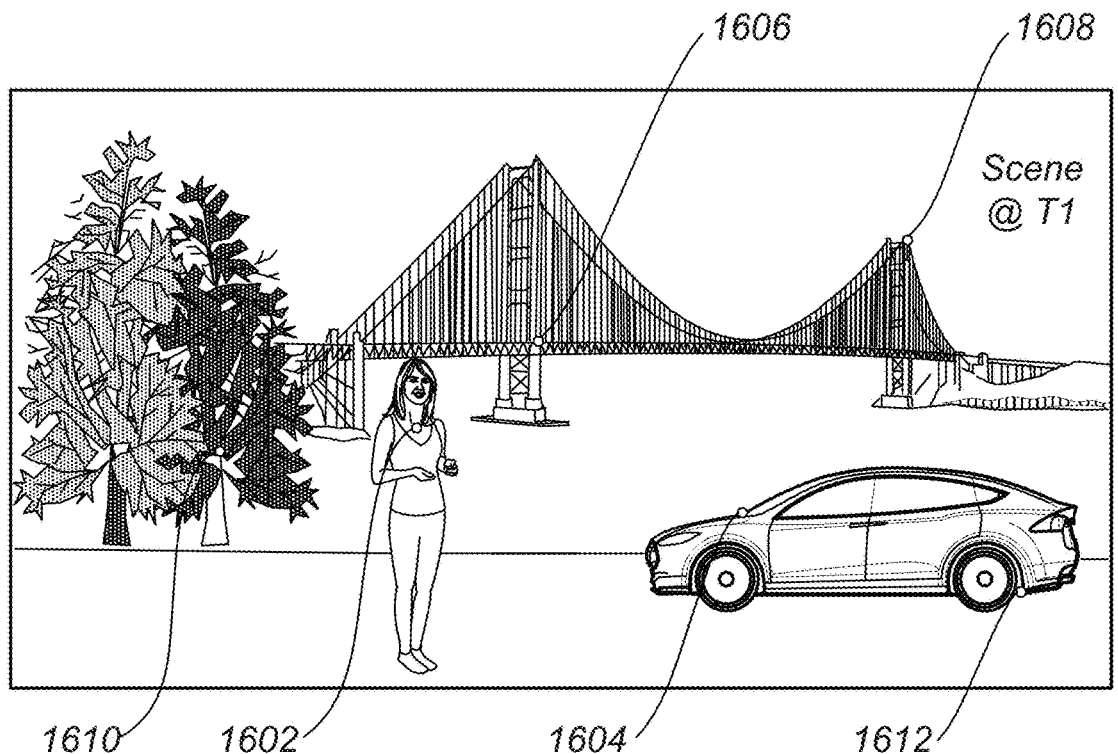
FIGS. 16A-16B illustrate an example of an image transformation between two frames using tracked control points between the two frames.
Figure 16B:
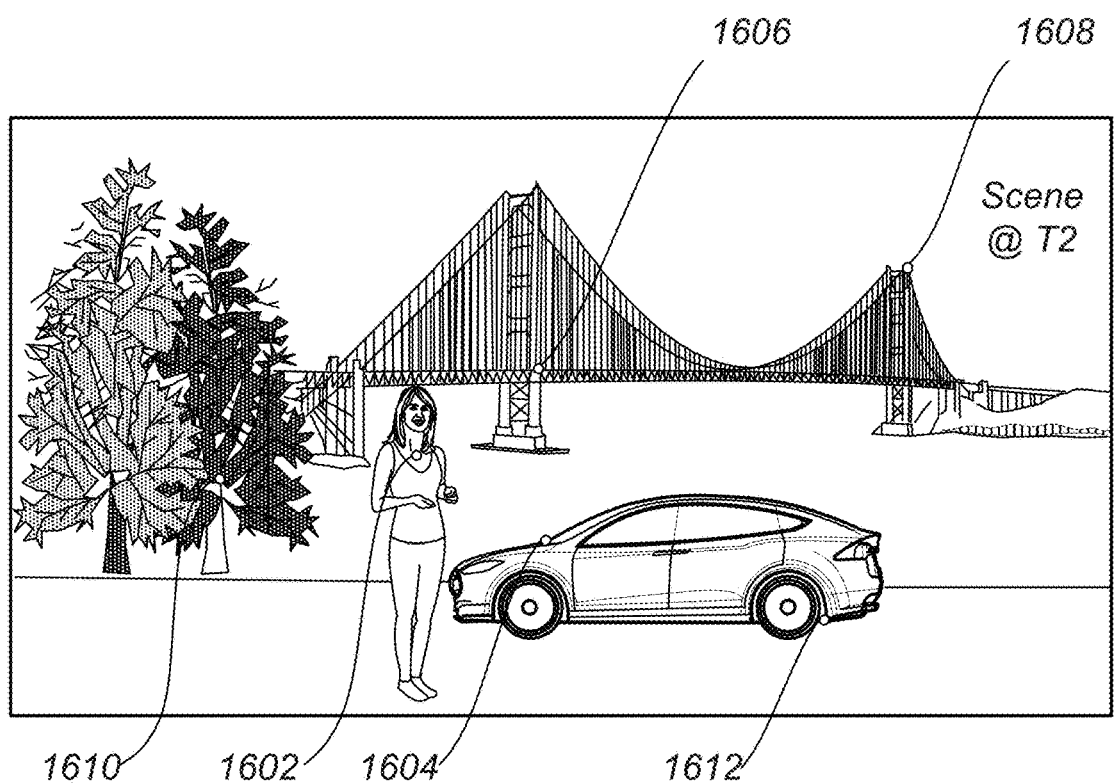

With reference to FIGS. 16A-16B, shown is an example of an image transformation between two frames using tracked control points between the two frames. In particular, FIG. 16A shows a first frame of a scene at a first time T1 and FIG. 16B shows a second frame of the scene at a second time T2. A set of control points 1602, 1604, 1606, 1608, 1610, and 1612 are tracked between the two frames, such that their locations are known in both frames. An intermediate frame X at x \in [0, 1] between these two frames can be generated by interpolating the location of all control points individually for x and then computing the image data for frame X by interpolating all pixel locations using those control points. In some examples, the set of control points are located within a single layer that includes particular objects viewable in the first frame and second frame. In this case, generating an artificially rendered image may include interpolating image data for multiple layers and combining these layers. In other example, each pixel in the first frame corresponds to a control point in the set of control points. Accordingly, each pixel is tracked and interpolated in that instance.

In the present embodiment, an artificially rendered image is generated as intermediate frame X by tracking a set of control points between the first frame and the second frame, and interpolating individual control points for the third location X using the set of control points and interpolating pixel locations using the individual control points. As shown, the first frame includes a first image captured from a first location and the second frame includes a second image captured from a second location. In one example, interpolating the pixel locations includes interpolation using barycentric coordinates based on three or more control points. In another example, interpolating the pixel locations includes interpolation using splines. In yet another example, interpolating the pixel locations includes interpolation using finite elements. In yet another example, interpolating the pixel locations includes using motion of the nearest control point. In some examples, interpolating pixel locations using the individual control points includes using dense optical flow. In other examples, interpolating pixel locations using the individual control points includes using depth data.

Figure 17:
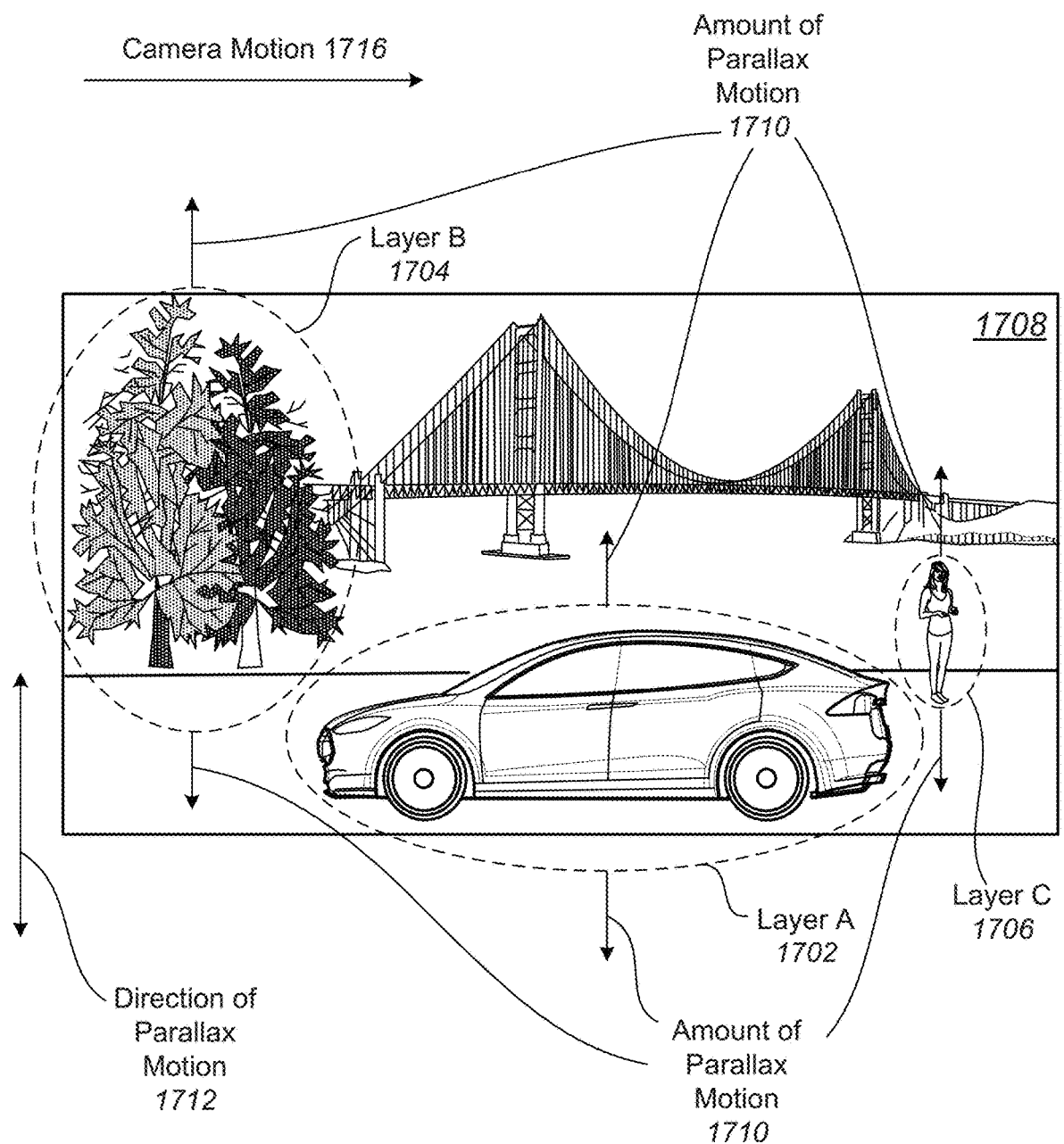
FIG. 17 illustrates an example of viewpoint extrapolation outside of the trajectory between two frames using multiple layers and the parallax effect.

With reference to FIG. 17, shown is an example of viewpoint extrapolation outside of the trajectory between two frames using multiple layers and the parallax effect. Using multiple layers, viewpoint-extrapolation outside of a trajectory between two frames can be achieved by moving the different layers in perpendicular motion to the trajectory motion. As shown, a scene 408 includes multiple layers, such as Layer A 1702, Layer B 1704, and Layer C 1706. Although not shown, two frames capturing images of the scene 1708 can be obtained by moving a camera along camera motion 1716. Comparing the two images will show parallax motion in the direction 1712. As shown in the figure, the amount of parallax motion 1710 of each of the layers can indicate movement or differences between the frames. Although not indicated in the figure, the different layers 1702, 1704, and 1706 can each have different amounts of parallax motion.

In the present embodiment an artificially rendered image is generated using this parallax effect. In particular, a set of control points (not shown) is moved perpendicular to a trajectory between a first frame and a second frame. In this example, the first frame includes a first image captured from a first location and the second frame includes a second image captured from a second location and each control point is moved based on an associated depth of the control point. Specifically, control points located at a further depth are moved less than control points at a closer depth in some examples. Additionally, in some applications, each pixel in the first image corresponds to a control point in the set of control points. Furthermore, in addition to having a concrete depth associated with a point, it is also possible to infer the depth from the amount of frame-to-frame motion of the control points.

Next, an artificially rendered image corresponding to a third location outside of the trajectory is generated by extrapolating individual control points using the set of control points for the third location and extrapolating pixel locations using the individual control points. In some examples, extrapolating the pixel locations includes extrapolation using barycentric coordinates based on three or more control points. In other examples, extrapolating the pixel locations includes extrapolation using splines. In yet other examples, extrapolating the pixel locations includes extrapolation using finite elements. In other instances, extrapolating the pixel locations includes using motion of a nearest control point. In yet other instances, extrapolating pixel locations using the individual control points includes using dense optical flow.

Figure 18:
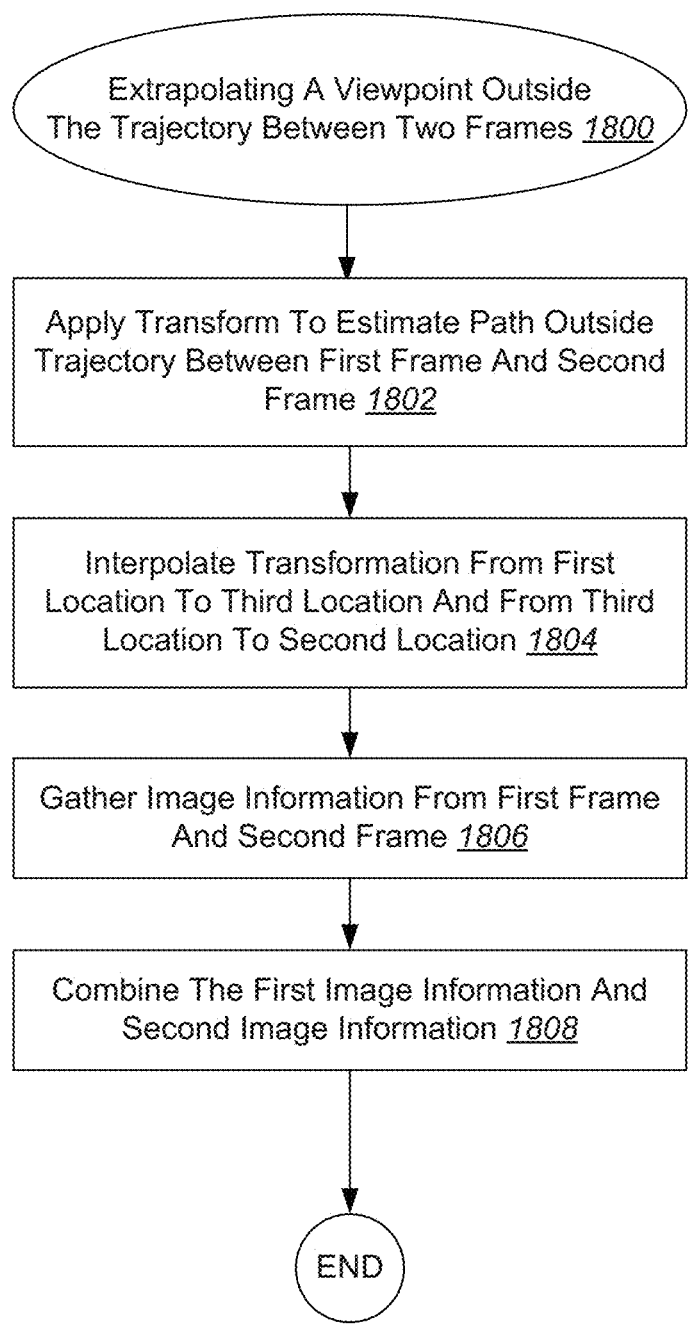
FIG. 18 illustrates an example of a process for extrapolating a viewpoint outside the trajectory between two frames.

With reference to FIG. 18, shown is an example of a process 1800 for extrapolating a viewpoint outside the trajectory between two frames. This process can be viewed as an extension to the process described with regard to FIG. 14, where viewpoints for locations outside of the trajectory between Frame A and Frame B are extrapolated by applying a transform which warps the image according the curvature and direction of the estimated path.

In the present embodiment, a transform is applied to estimate a path outside the trajectory between a first frame and a second frame at 1802. The first frame includes a first image captured from a first location and the second frame includes a second image captured from a second location. In some examples, the first image and second image are associated with the same layer. Furthermore, this process can be applied to various layers and the resulting images representing the layers can be combined to generate a complete image. Next, an artificially rendered image corresponding to a third location positioned on the path is generated. The artificially rendered image is generated by first interpolating a transformation from the first location to the third location and from the third location to the second location at 1804. Image information is then gathered from the first frame and the second frame at 1806 by transferring first image information from the first frame to the third frame based on the interpolated transformation and second image information from the second frame to the third frame based on the interpolated transformation. Finally, the first image information and the second image information is combined at 1808.

According to present embodiment, the transform can implement various features. For instance, the transform can implement features such as homography, spherical projection, and/or cylindrical projection. These features can be used alone or in conjunction with one another in applying the transform. Additional features not mentioned can also be implemented within the scope of this disclosure.

The present embodiment describes one method of extrapolating a viewpoint outside the trajectory between two frames. However, additional methods for extrapolating such viewpoints can also be implemented in other embodiments. For instance, as described above with regard to FIG. 17, another way to extrapolate viewpoints for locations outside of the trajectory between two frames can include moving the layers and/or control points perpendicular to the trajectory direction based on their depth. Specifically, layers/control points at greater depth are moved less than layers/control points at lesser depth. Depending on the characteristics of the frames, different methods can be chosen to provide an appropriate result.

Figure 19:
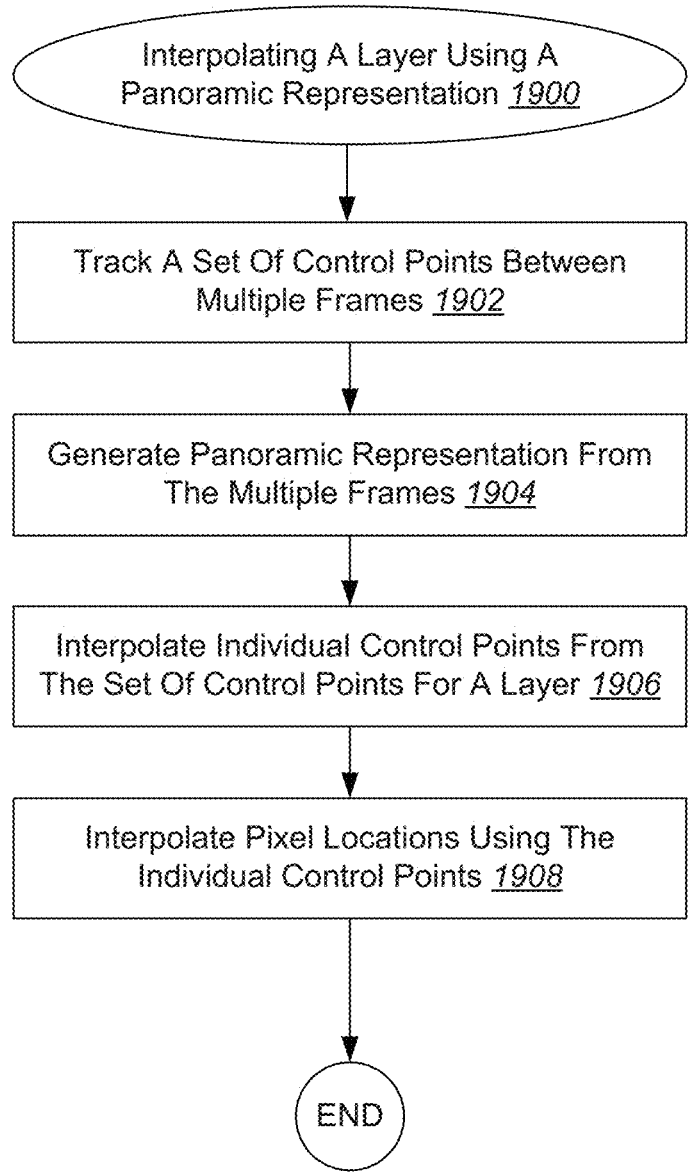
FIG. 19 illustrates an example of a process for interpolating a layer using a panoramic representation.

With reference to FIG. 19, shown is an example of a process 1900 for interpolating a layer using a panoramic representation. In this example, the span of a layer is not restricted to two frames but is constructed from multiple frames. Specifically, a panorama is created from the corresponding background regions and combined into a panoramic representation. This panorama representation is then used to interpolate the corresponding layer. Although this process is described in terms of a background layer, this process can also be extended to other types of layers. For instance, the process can be applied to layers that include objects, such as context layers.

In the present embodiment, a set of control points is tracked between multiple frames associated with the same layer at 1902. In some examples, each pixel corresponds to a control point in the set of control points. In these cases, each pixel is then interpolated based on the set of control points for the artificially rendered image. Next, a panoramic representation is generated from the multiple frames at 1904. Individual control points are then interpolated from the set of control points at 1906 for a desired frame or layer. Pixel locations are then interpolated for this frame or layer using the individual control points at 1908. From this interpolation, the artificially rendered image/layer is generated.

According to various embodiments, interpolation can be implemented using a variety of methods. For instance, interpolating the pixel locations can include interpolation using barycentric coordinates based on three or more control points. In some examples, interpolating the pixel locations includes interpolation using splines. In other examples, interpolating the pixel locations includes interpolation using finite elements. In yet other examples, interpolating the pixel locations includes using motion of a nearest control point. In addition, interpolating pixel locations using the individual control points includes using dense optical flow in some applications. Although particular examples of interpolation methods are described, any combination of these or other methods can be used.

Figure 20:
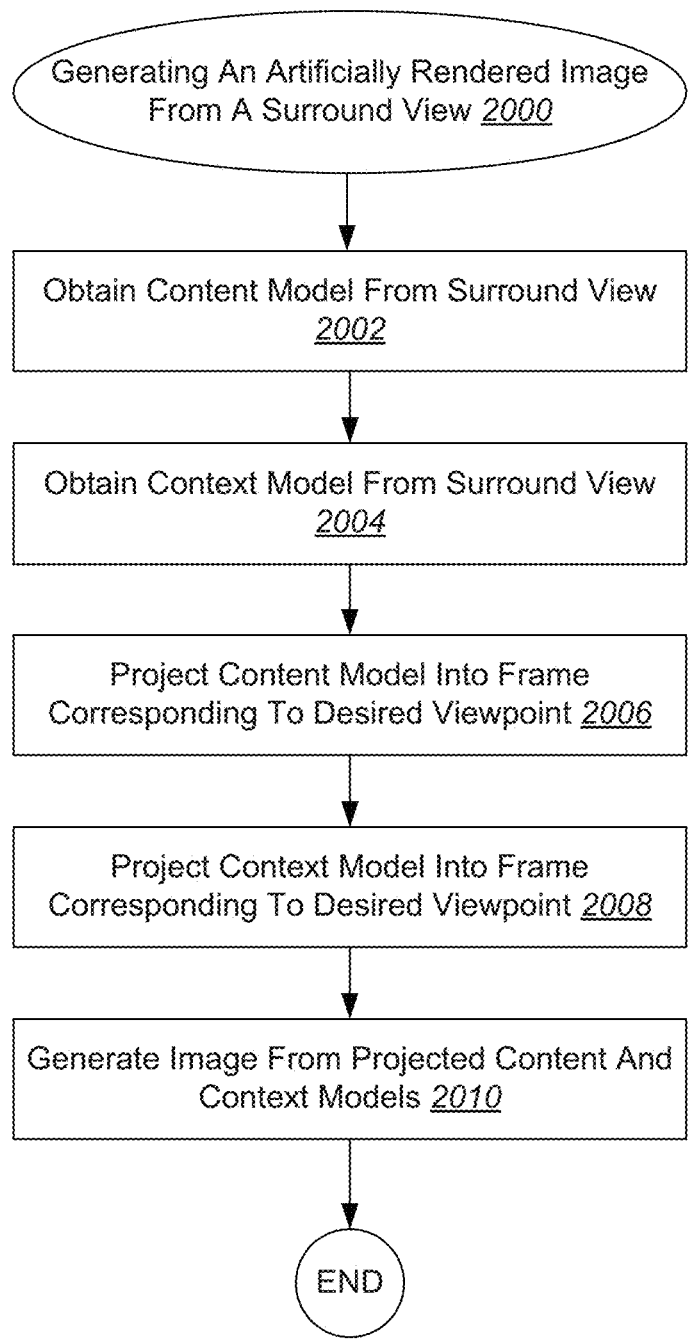
FIG. 20 illustrates an example of a process for generating an artificially rendered image from a surround view.

With reference to FIG. 20, shown is an example of a process 2000 for generating an artificially rendered image from a surround view. As described previously, a surround view is a multi-view interactive digital media representation. In some examples, the surround view is generated from multiple images having location information, and at least a portion of overlapping subject matter. Furthermore, according to various embodiments, the surround view is generated by interpolating between the multiple images and/or extrapolating data from the multiple images. In the present example, a surround view can be decomposed into one or more background panoramic representations and, in some examples, one or more foreground 3D models. An image at a specific viewpoint is then rendered by projecting the 3D model(s) and the panoramic representation(s) into a frame according to the current viewpoint and the depth and orientation of the 3D model(s).

In the present embodiment, a content model is obtained from a surround view at 2002. This content model is a foreground three-dimensional model including at least one object. In some examples, obtaining the content model from the surround view includes extracting the content model from the surround view. At 2004, a context model is obtained from the surround view. This context model is a background panoramic representation including scenery surrounding any objects in the content model. In some examples, obtaining the context model from the surround view includes extracting the context model from the surround view. Next, the content model is projected into a frame corresponding to a desired viewpoint at 2006. The context model is also projected into the frame corresponding to the desired viewpoint at 2008. According to various embodiments, the content model and context model are projected according to the depth and orientation of the content model. The artificially rendered image at the desired viewpoint is generated from a combination of the projected content and context at 2010.

Various examples of viewpoint interpolation and extrapolation are described in the present disclosure. According to various embodiments, one or a combination of methods can be used to generate a single artificially rendered image. For instance, one layer can be handled using the method described with regard to FIG. 14, another layer can be handled using the method described with regard to FIGS. 16A-16B, and a background layer can be handled using the method described with regard to FIG. 19. Any combination of methods can be used within the scope of this disclosure. Additionally, any one method can be used alone to generate an artificially rendered image.

With reference to FIG. 21, shown is an example method 2100 for determining the optimal transformation using focal length and rotation as parameters, in accordance with one or more embodiments. In some embodiments, method 2100 is implemented to calculate the transformations to rotate frames in a sequence of images, such as during image rotation, as previously mentioned at step 1011. In some embodiments, method 2100 may be implemented as image stabilization to stabilize captured image frames in the image sequence corresponding to a surround view. In some embodiments, method 2100 may be implemented at step 1011 and/or before selecting a first frame for viewing at step 1007

At step 2101, first and second image frames are identified. In some embodiments, the first and second image frames may be part of a sequence of images captured at step 1001. In various embodiments, the image frames may be consecutively captured images in time and/or space. In some embodiments, the first and second image frames may be adjacent image frames, such as frame N and frame N+1. In other embodiments, image frames identified at step 2101 may not be adjacent frames, but may be frames separated by one or more other frames, such as frame N and frame N+x. In some embodiments, one or more of the identified image frames are artificially interpolated image frames.

A RANSAC (random sample consensus) algorithm may be implemented to determine the optimal transformation between the two image frames. As described herein, focal length and rotation may be identified from keypoints tracked from a first frame to a second frame. Various transformations may be calculated from these parameters gathered from various combinations of keypoints and applied to the first frame and/or the second frame. The number of inlier keypoints and/or image intensity difference between the two frames is determined after a transformation has been applied. The RANSAC algorithm may test a predetermined number of calculated transformations as such, to determine an optimal transformation resulting in the largest number of inlier keypoints and/or a minimal image intensity difference.

At step 2103, keypoints in the first frame and corresponding keypoints in the second frame are identified. In some embodiments, the first frame includes an image that was captured before the image in the second frame. In other embodiments, the first frame may include an image captured after the image in the second frame. In various embodiments, keypoints may be identified using a Harris-style corner detector algorithm or other keypoint detection method. In other embodiments, various other corner detection algorithms may be implemented, such as a Moravec corner detection algorithm, a Forstner corner detector, etc. Such corner detector algorithm may be implemented to detect salient features to designate as keypoints in each frame, such as areas of large contrast, areas with minimum ambiguity in different dimensions, and/or areas with high cornerness. A predetermined number keypoints with the highest Harris score may then be selected. For example, 1,000 keypoints may be identified and selected on the first frame. The corresponding 1,000 keypoints on the second frame can then be identified using a Kanade-Lucas-Tomasi (KLT) feature tracker to track keypoints between the two image frames.

At step 2105, two keypoints in the first frame and the corresponding keypoints in the second frame are selected. In some embodiments, the two keypoints in the first frame may be selected randomly by the RANSAC algorithm. The two corresponding keypoints in the second frame may be identified by the KLT feature tracker. In some embodiments, two keypoints may be randomly selected in the second frame and the corresponding keypoints in the first frame are identified. Each pair of corresponding keypoints may be referred to herein as a correspondence. For example, keypoint A on frame N and keypoint A' on frame N+1 correspond to each other via KLT feature tracking and may comprise a pair (A, A'). A second correspondence (B, B') may be selected at step 2105 which comprises keypoint B on frame N and keypoint B' on frame N+1.

Based on the two point correspondences, the focal length and rotation are solved to calculate the transformation at step 2107. In other words, a transformation, T, between the first frame and second frame may be calculated from the two corresponding pairs of keypoints using a predetermined algorithm. For example, a mathematical model may be used, such as that provided in M. Brown, R. Hartley, and D. Nister. Minimal solutions for panoramic stitching. In Proceedings of the International Conference on Computer Vision and Pattern Recognition (CVPR07), Minneapolis, June 2007. In order to calculate a transformation based on rotation and focal length, four parameters are required: three for rotation and one for focal length. Each correspondence of a keypoint between frames provides two constraints. Thus, four constraints can be provided by the two correspondences for each selected keypoints between frames. The derived close-form solution is the calculated transformation based on the two selected keypoints.

At step 2109, the calculated transformation T1 is applied to each keypoint in the first frame which is warped onto the second frame. In other words, the all keypoints in the first frame are transformed to the second image via applying the calculated transformation. The transformation is reversible and in some embodiments, the keypoints in the second frame may be transformed onto the first frame after the calculated transformation is applied to keypoints in the second frame.

At step 2111, an inlier group of transformed keypoints is determined. In some embodiments, a transformed keypoint in the first frame is considered an inlier if the transformation T1 correctly transforms the keypoint to match the corresponding keypoint in the second frame. In some embodiments, this can be determined by computing the L2 distance between a transformed keypoint and its corresponding keypoint on the second image. For example, a transformed keypoint on a first frame N may be denoted as K^ and its corresponding keypoint on the second frame N+1 may be denoted as K'. The L2 distance is computed as ‖A^−A'‖, which corresponds to the distance between two 2D points. If the distance between any keypoint correspondence is within a predetermined threshold distance in any direction, then the correspondence will be determined to be an inlier. In other words, if the difference between any keypoint correspondence is greater than the predetermined threshold distance, then the keypoint will be determined to be an outlier.

For example, the threshold distance may be threshold pixel distance, which is the L2 distance between two keypoints in a correspondence. Thus, if the distance between a keypoint K^ and its corresponding keypoint K' is more than 2 pixels, then that keypoint correspondence will be determined to be an outlier based on the transformation applied at step 2109. In various embodiments, the threshold pixel distance may be a function of image resolution and can scale linearly. For example, method 2100 may be processing images at a 320×180 pixels resolution and use a threshold pixel distance of 2 pixels. However, if method 2100 is used to process images at a 1080p (1920×1080 pixels) resolution, then a threshold pixel distance of 6-8 pixels may be used. In some embodiments, a different threshold pixel distance may be chosen for a given image resolution. In some embodiments, the threshold pixel distance may be empirically determined based on experimental results of accuracy.

After all keypoint correspondences have been measured as such, it is determined whether the calculated transformation T1 resulted in the largest inlier group identified, at step 2113. If the transformation T1 calculated applied at step 2109 does not result in the largest group of inlier keypoints, the calculated transformation T1 is discarded at step 2117. In other words, if a larger inlier group was identified based on a previous transformation, T0, calculated at step 2107 and applied at step 2109, then the current calculated transformation T1 is discarded. If the transformation T1 calculated at step 2107 is the first calculated transformation within the RANSAC algorithm, then it necessarily results in the largest group of inlier keypoints and the transformation data will be stored for comparison with subsequently calculated transformations.

If the calculated transformation T1 applied at step 2109 does result in the largest group of inlier keypoints, the image intensity difference between the first frame and the second frame is calculated at step 2115. In some embodiments, the calculated transformation T1 may be applied to every pixel in the first frame to warp the first frame onto the second frame, and an image intensity difference is calculated between the transformed first frame and the second frame. For example, an error or difference for each color channel is calculated between each corresponding pixel in the two frames. Then an average error of the RGB value of all color channels is derived for each pixel. Next, the average error for all pixels within the first and second frames is calculated. In some embodiments, the image intensity difference between two frames will be between 0 and 255. A lower image intensity difference value corresponds to a closer image match between frames, and consequently a more accurate transformation.

There may be instances where a larger inlier group is determined at step 2113, but a higher image intensity difference value is calculated at step 2115. In this instance, the transformation resulting in the higher image intensity difference value will be discarded. Alternatively, the transformation resulting in the larger inlier group may be stored in some embodiments. Such instances are more likely to occur in instances where stabilization of foreground is desired in image frames that include large textured background regions. Accordingly, the RANSAC algorithm may result in calculated transformations that include large inlier keypoint sets that correspond to the large background, instead of the foreground. This may result in higher intensity error in the foreground region. To compensate for this in some embodiments, the RANSAC algorithm may measure focal length and rotation using only keypoints located in the foreground of an image. A background keypoint removal may be performed on the image frames within a sequence of images before the RANSAC algorithm is implemented. Keypoints corresponding to the background of an image may be identified based on IMU data to calculate how such keypoints with focal points at infinity should move between frames. Once identified, such background keypoints are removed, such that the RANSAC algorithm calculated transformations at step 2107 using only keypoints corresponding to the foreground. This may reduce undesired transformations resulting in larger inlier groups (aligning the background), but higher image intensity difference values (from unaligned foreground). Such background keypoint removal may also be used with concave surround views, such as the surround view depicted in FIG. 6B. In convex panoramic surround views, calculating transformations from keypoints corresponding to the background and the foreground may be desired.

It is then determined whether the calculated image intensity difference is the lowest image intensity difference identified at 2119. If a lower image intensity difference was determined from a previous transformation, such as T0, calculated at step 2107, then the current transformation T1 is discarded at 2117, and another two keypoint correspondences may be randomly selected at step 2105. If however, the image intensity difference for the present transformation T1 is determined to be the lowest out of all previously determined image intensity differences for prior transformations, then the current transformation is designated as the optimal transformation for the first and second frames at step 2121.

In some embodiments, step 2115 is only implemented if a larger inlier group is determined at 2113. The transformation calculated at step 2107 in a first iteration of the RANSAC algorithm would necessarily result in the largest inlier group. In other embodiments, step 2115 may be implemented if the inlier group determined at 2113 is at least equal to the largest inlier group resulting from a previous transformation. In rare instances, a subsequent transformation calculated at step 2107 may result in the same inlier group size, as well as the same image intensity difference. In such instance, the transformation calculated first may be kept while the second transformation is discarded at step 2117. In other embodiments, the subsequent transformation is kept while the previous transformation discarded.

The method 2100 may then return to step 2105 to select another two correspondences of keypoint pairs. Such keypoint correspondences may include another randomly selected pair of keypoints in the first frame. In some instances, randomly selected keypoint correspondences may be correspondences that were previously selected at step 2105. For example, correspondence (A, A') and a third corresponding keypoint pair (C, C') may be selected in the second iteration of the RANSAC algorithm. In even rarer occasions, the same exact keypoint pairs may be selected in subsequent iterations of the RANSAC algorithm. For example, a subsequent iteration of the RANSAC algorithm may again select correspondences (A, A') and (B, B'). In this case, the resulting inlier group size and calculated image intensity difference would be identical to the previously calculated transformation based on the previous iteration. In this instance, the first transformation will be kept and the subsequent iteration involving the same calculated transformation will be discarded. However, the probability of such occurrence may be very unlikely depending on the number of keypoints identified on an image frame, for example, 1,000 keypoints. Thus, the chance occurrence of this instance can simply be ignored.

The RANSAC algorithm of method 2100 may continue for any number of predetermined cycles. For example, the RANSAC algorithm may perform steps 2105 through 2117 one hundred times for two image frames. However, the RANSAC algorithm may be performed any number of cycles as desired. The result of method 2100 is an optimal transformation between the first frame and the second frame, which results in the largest amount of inlier keypoints and the lowest image intensity difference when the transformation is applied to the first frame and warped onto the second frame, or vice versa.

According to various embodiments, the image warp may be constructed from the transformation corresponding to the optimal focal length and rotation. In some embodiments, the image warp is constructed as $KRK^{-1}$, where K is an intrinsic parameter given the optimal focal length, and R is a 3×3 rotation matrix. K is a 3×3 focal length matrix, and $K^{-1}$ is the inverse matrix of K. R may be a special orthogonal group 3, or SO(3), matrix. Applying this 3×3 3D transformation to the second image in the stereo pair will ensure that the second image frame is always perpendicular to the line of sight to the object of interest and/or foreground. In some embodiments, method 2100 may be implemented to determine the optimal transformation between each frame in the image sequence, which can be used to compose a trajectory for the image sequence of the surround view created at step 1003 of method 1000. In some embodiments, method 2100 may be implemented to stabilize the captured images of the image sequence of the surround vie created at step 1003. In such embodiments, subsequent rotation may not be required for image frames in a stereo pair.

As described, using focal length and camera rotation as stabilization and/or rotation parameters has a clear physical mean. In other words, given the captured image sequence, each image represents a three-dimensional camera location of a camera in a three-dimensional world, the rotation is modeled as how to rotate and zoom these set of cameras in three-dimensional space in order to produce a spatially correct rotation for a concave capture area. However, such method will also produce spatially correct rotations for convex panoramic capture areas as well. Because, the image warp is mapped from physically meaningful parameters (focal length and camera rotation), the warped image will follow optical rules of physics, and the rotated image will be optically correct and free from unsound distortion. When implemented within methods 1000 and/or 1100, image rotation through method 2100 effectively applies an optically correct 3×3 image warp to images designated for the left eye and right eye providing a more realistic and undistorted stereoscopic view over existing methods of image rotation.

The methods presented in this disclosure are highly efficient and can be run on a mobile platform in real-time. The various methods require only very small amounts of additional data and are therefore extremely well-suited for data that needs to be sent over a wireless network (e.g. LTE). In addition, the methods are sufficiently regularized to handle problematic cases without creating jarring artifacts. Accordingly, the methods described herein are suitable for generating artificially rendered images on mobile devices, etc.

Figure 22:
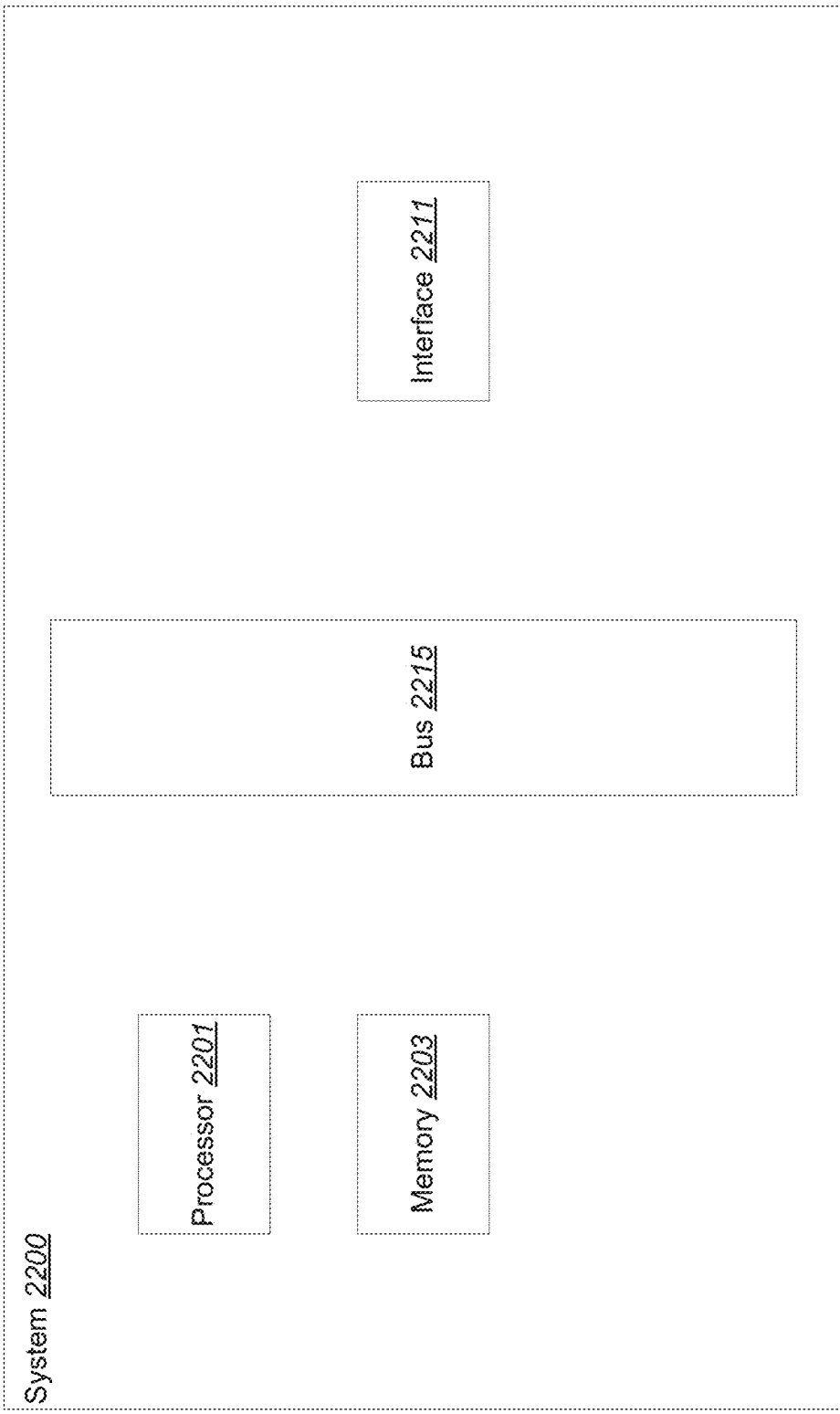
FIG. 22 illustrates a particular example of a computer system that can be used with various embodiments of the present disclosure.

Various computing devices can implement the methods described. For instance, a mobile device, computer system, etc. can be used to generate artificially rendered images. With reference to FIG. 22, shown is a particular example of a computer system that can be used to implement particular examples of the present disclosure. For instance, the computer system 2200 can be used to provide surround views according to various embodiments described above. According to particular example embodiments, a system 2200 suitable for implementing particular embodiments of the present disclosure includes a processor 2201, a memory 2203, an interface 2211, and a bus 2215 (e.g., a PCI bus). The interface 2211 may include separate input and output interfaces, or may be a unified interface supporting both operations. When acting under the control of appropriate software or firmware, the processor 2201 is responsible for such tasks such as optimization. Various specially configured devices can also be used in place of a processor 2201 or in addition to processor 2201. The complete implementation can also be done in custom hardware. The interface 2211 is typically configured to send and receive data packets or data segments over a network. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 2200 uses memory 2203 to store data and program instructions and maintained a local side cache. The program instructions may control the operation of an operating system and/or one or more applications, for example. The memory or memories may also be configured to store received metadata and batch requested metadata.

Because such information and program instructions may be employed to implement the systems/methods described herein, the present disclosure relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present disclosure.

While the present disclosure has been particularly shown and described with reference to specific embodiments thereof, it will be understood by those skilled in the art that changes in the form and details of the disclosed embodiments may be made without departing from the spirit or scope of the disclosure. It is therefore intended that the disclosure be interpreted to include all variations and equivalents that fall within the true spirit and scope of the present disclosure.

What is claimed is:

1. A method for generating stereo pairs for virtual reality using a single lens camera, the method to be performed by a computing device, the method including:
   obtaining a monocular sequence of images using the single lens camera during a capture mode, the sequence of images being capture along a camera translation, wherein each image in the sequence of images contains at least a portion of overlapping subject matter, the subject matter including an object; and
   generating stereo pairs for virtual reality using the sequence of images, the stereo pairs being generated for one or more points along the camera translation, wherein generating stereo pairs includes:
   selecting frames for each stereo pair based on a spatial baseline, each selected frame having a virtual or captured image;
   interpolating virtual images in between captured images in the sequence of images, wherein each virtual image is interpolated using infinite smoothing including:
      computing a plurality of transformations using keypoint correspondences between two captured images;
      determining an optimal subset of transformations from the plurality of transformations by selecting an optimal transformation candidate for each pixel of a first captured image, wherein selecting an optimal transformation candidate for each pixel is processed as a separate thread of a graphics processing unit (GPU) such that the processing time for each pixel is bounded by $O(1)$ rather than $O(n)$, wherein the plurality of transformations includes a subset of transformation candidates, wherein determining the optimal subset of transformations includes applying each transformation candidate in the subset of transformation candidates to each pixel in the first captured image, thereby generating a plurality of first interpolated pixel candidates, and to a corresponding pixel in the second captured image, thereby generating a plurality of second interpolated pixel candidates, and then comparing the plurality of first interpolated pixel candidates to the corresponding plurality of second interpolated pixel candidates to select an optimal transformation candidate having the smallest corresponding pixel candidate difference;
      calculating transformation parameters corresponding to the optimal subset of transformations; and
      interpolating the virtual image between the first and second captured images using the calculated transformation parameters;
   correcting selected frames by rotating the virtual or captured images in the selected frames, wherein rotating the virtual or captured images in the selected frames includes using Inertial Measurement Unit (IMU) and image data to identify regions that belong to the foreground and regions that belong to the background; and
   rendering the selected frames by assigning each virtual or captured image in the selected frames to left and right eyes.

2. The method of claim 1, wherein each image in the sequence of images is captured at a predetermined distance along the camera translation.

3. The method of claim 1, wherein the camera captures images while traveling along an arc path, the arc path being delineated by 100 points labeled $t_1$ through $t_{100}$ evenly distributed along the arc path, wherein the camera captures images along points $t_1$ through $t_{100}$.

4. The method of claim 3,
   wherein the sequence of images are obtained as the camera travels along a uniform camera translation, and
   wherein each stereo pair includes a first image and a second image located at a predetermined point from the first image.

5. The method of claim 1, wherein a stereo pair includes an interpolated virtual image as one of the selected frames.

6. The method of claim 1, wherein correcting the selected frames includes rotating the image of a selected frame such that the image is angled toward the object by rotating the image plane of the image.

7. The method of claim 1, wherein the sequence of images are fused to generate a surround view of the object.

8. A system for generating stereo pairs for virtual reality, the system comprising:
   a single lens camera,
   a processor, and
   memory storing one or more programs configured for execution by the processor, the one or more programs comprising instructions for:
      obtaining a monocular sequence of images using the single lens camera during a capture mode, the sequence of images being capture along a camera translation, wherein each image in the sequence of images contains at least a portion of overlapping subject matter, the subject matter including an object; and
      generating stereo pairs for virtual reality using the sequence of images, the stereo pairs being generated for one or more points along the camera translation, wherein generating stereo pairs includes:
      selecting frames for each stereo pair based on a spatial baseline, each selected frame having a virtual or captured image;
      interpolating virtual images in between captured images in the sequence of images, wherein each virtual image is interpolated using infinite smoothing including:
         computing a plurality of transformations using keypoint correspondences between two captured images;
         determining an optimal subset of transformations from the plurality of transformations by selecting an optimal transformation candidate for each pixel of a first captured image, wherein selecting an optimal transformation candidate for each pixel is processed as a separate thread of a graphics processing unit (GPU) such that the processing time for each pixel is bounded by $O(1)$ rather than $O(n)$, wherein the plurality of transformations includes a subset of transformation candidates, wherein determining the optimal subset of transformations includes applying each transformation candidate in the subset of transformation candidates to each pixel in the first captured image, thereby generating a plurality of first interpolated pixel candidates, and to a corresponding pixel in the second captured image, thereby generating a plurality of second interpolated pixel candidates, and then comparing the plurality of first interpolated pixel candidates to the corresponding plurality of second interpolated pixel candidates to select an optimal transformation candidate having the smallest corresponding pixel candidate difference;

calculating transformation parameters corresponding to the optimal subset of transformations; and interpolating the virtual image between the first and second captured images using the calculated transformation parameters;

correcting selected frames by rotating the virtual or captured images in the selected frames, wherein rotating the virtual or captured images in the selected frames includes using Inertial Measurement Unit (IMU) and image data to identify regions that belong to the foreground and regions that belong to the background; and rendering the selected frames by assigning each virtual or captured image in the selected frames to left and right eyes.

9. The system of claim 8, wherein each image in the sequence of images is captured at a predetermined distance along the camera translation.

10. The system of claim 8, wherein the camera captures images while traveling along an arc path, the arc path being delineated by 100 points labeled $t_1$ through $t_{100}$ evenly distributed along the arc path, wherein the camera captures images along points $t_1$ through $t_{100}$.

11. The system of claim 10, wherein the sequence of images are obtained as the camera travels along a uniform camera translation, and wherein each stereo pair includes a first image and a second image located at a predetermined point from the first image.

12. The system of claim 8, wherein a stereo pair includes an interpolated virtual image as one of the selected frames.

13. The system of claim 8, wherein correcting the selected frames includes rotating the image of a selected frame such that the image is angled toward the object by rotating the image plane of the image.

14. The system of claim 8, wherein the sequence of images are fused to generate a surround view of the object.

15. A non-transitory computer readable medium storing one or more programs configured for execution by a computer, the one or more programs comprising instructions for:

obtaining a monocular sequence of images using the single lens camera during a capture mode, the sequence of images being capture along a camera translation, wherein each image in the sequence of images contains at least a portion of overlapping subject matter, the subject matter including an object; and generating stereo pairs for virtual reality using the sequence of images, the stereo pairs being generated for one or more points along the camera translation, wherein generating stereo pairs includes:

selecting frames for each stereo pair based on a spatial baseline, each selected frame having a virtual or captured image;

interpolating virtual images in between captured images in the sequence of images, wherein each virtual image is interpolated using infinite smoothing including:

computing a plurality of transformations using keypoint correspondences between two captured images;

determining an optimal subset of transformations from the plurality of transformations by selecting an optimal transformation candidate for each pixel of a first captured image, wherein selecting an optimal transformation candidate for each pixel is processed as a separate thread of a graphics processing unit (GPU) such that the processing time for each pixel is bounded by $O(1)$ rather than $O(n)$, wherein the plurality of transformations includes a subset of transformation candidates, wherein determining the optimal subset of transformations includes applying each transformation candidate in the subset of transformation candidates to each pixel in the first captured image, thereby generating a plurality of first interpolated pixel candidates, and to a corresponding pixel in the second captured image, thereby generating a plurality of second interpolated pixel candidates, and then comparing the plurality of first interpolated pixel candidates to the corresponding plurality of second interpolated pixel candidates to select an optimal transformation candidate having the smallest corresponding pixel candidate difference;

calculating transformation parameters corresponding to the optimal subset of transformations; and interpolating the virtual image between the first and second captured images using the calculated transformation parameters;

correcting selected frames by rotating the virtual or captured images in the selected frames, wherein rotating the virtual or captured images in the selected frames includes using Inertial Measurement Unit (IMU) and image data to identify regions that belong to the foreground and regions that belong to the background; and rendering the selected frames by assigning each virtual or captured image in the selected frames to left and right eyes.

16. The non-transitory computer readable medium of claim 15, wherein each image in the sequence of images is captured at a predetermined distance along the camera translation.

17. The non-transitory computer readable medium of claim 15, wherein the camera captures images while traveling along an arc path, the arc path being delineated by 100 points labeled $t_1$ through $t_{100}$ evenly distributed along the arc path, wherein the camera captures images along points $t_1$ through $t_{100}$.

18. The non-transitory computer readable medium of claim 15, wherein a stereo pair includes an interpolated virtual image as one of the selected frames.

19. The non-transitory computer readable medium of claim 15, wherein correcting the selected frames includes rotating the image of a selected frame such that the image is angled toward the object by rotating the image plane of the image.

20. The non-transitory computer readable medium of claim 15, wherein the sequence of images are fused to generate a surround view of the object.

* * * * *